(12) United States Patent
Xi et al.

(10) Patent No.: US 8,065,506 B2
(45) Date of Patent: Nov. 22, 2011

(54) APPLICATION SPECIFIC INSTRUCTION SET PROCESSOR FOR DIGITAL RADIO PROCESSOR RECEIVING CHAIN SIGNAL PROCESSING

(75) Inventors: Jinwen Xi, Plano, TX (US); Roman Staszewski, McKinney, TX (US); Thang Minh Tran, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 458 days.

(21) Appl. No.: 12/193,455

(22) Filed: Aug. 18, 2008

(65) Prior Publication Data

US 2009/0063820 A1    Mar. 5, 2009

Related U.S. Application Data

(60) Provisional application No. 60/956,616, filed on Aug. 17, 2007.

(51) Int. Cl.
G06F 17/00 (2006.01)
(52) U.S. Cl. ............................................. 712/225; 712/35
(58) Field of Classification Search .................. None
See application file for complete search history.

(56) References Cited

U.S. PATENT DOCUMENTS

| | | | | |
|---|---|---|---|---|
| 5,794,068 A | * | 8/1998 | Asghar et al. | 712/35 |
| 5,930,489 A | * | 7/1999 | Bartkowiak et al. | 712/200 |
| 6,487,575 B1 | * | 11/2002 | Oberman | 708/504 |
| 6,832,306 B1 | * | 12/2004 | Ganapathy et al. | 712/41 |
| 7,730,288 B2 | * | 6/2010 | Luick | 712/225 |
| 2003/0212729 A1 | * | 11/2003 | Eberle et al. | 708/625 |
| 2006/0004995 A1 | * | 1/2006 | Hetherington et al. | 712/235 |
| 2006/0015703 A1 | * | 1/2006 | Ramchandran et al. | 712/34 |
| 2007/0038848 A1 | * | 2/2007 | Gschwind et al. | 712/225 |
| 2007/0234014 A1 | * | 10/2007 | Kobayashi et al. | 712/220 |
| 2008/0109640 A1 | * | 5/2008 | Burky et al. | 712/206 |

OTHER PUBLICATIONS

Razdan, R., etal., A High-Performance Microarchitecture with Hardware-Programmable Functional Units, 1994, ACM, pp. 172-180.*
Intel Architecture Software Developers Manual vol. 2: Instruction Set Reference, 1999, Intel., 854 pages.*
Qunitana, F., etal, Adding a Vector Unit to a Superscalar Processor, 1999, ACM, pp. 1-10.*
Hauck, S., etal., The Chimaera Reconfigurable Functional Unit, 2004, IEEE,pp. 206-217.*
Schulte, M., etal., A Low Power Multithreaded Processor for Software Defined Radio., 2006, Springer Science +Business Media, Journal or VLSI Processing, pp., 145-159.*

* cited by examiner

*Primary Examiner* — Eric Coleman
(74) *Attorney, Agent, or Firm* — Robert D. Marshall, Jr.; W. James Brady; Frederick J. Telecky, Jr.

(57) ABSTRACT

This invention is an application specific integrated processor to implement the complete fixed-rate DRX signal processing paths (FDRX) for a reconfigurable processor-based multi-mode 3G wireless application. This architecture is based on the baseline 16-bit RISC architecture with addition functional blocks (ADU) tightly coupled with the based processor's data path. Each ADU accelerates a computation-intensive tasks in FDRX signal path, such as multi-tap FIRs, IIRs, complex domain and vectored data processing. The ADUs are controlled through custom instructions based on the load/store architecture. The whole FDRX data path can be easily implemented by the software employing these custom instructions.

14 Claims, 16 Drawing Sheets

APPLICATION SPECIFIC INSTRUCTION SET PROCESSOR FOR DIGITAL RADIO PROCESSOR RECEIVING CHAIN SIGNAL PROCESSING

CLAIM OF PRIORITY

This application claims priority under 35 U.S.C. 119(e)(1) to U.S. Provisional Application No. 60/956,616 filed Aug. 17, 2007.

TECHNICAL FIELD OF THE INVENTION

The technical field of this invention is data processing in wireless receivers.

BACKGROUND OF THE INVENTION

The continuous scaling of transistor size makes it possible to integrate more and more signal processing functionalities into the same silicon with less area overhead. Employing extensive digital signal processing technologies, a digital radio processor (DRP) can process RF signals in the digital domain as much as possible to provide better performance with reduced cost. Based on an all digital PLL (ADPLL) architecture, a digital radio processor integrates all necessary blocks including RF, analog/mixed-signal and digital ones to provide a single-chip solution for GSM/GPRS/EDGE (GGE) and WCDMA applications.

The DRP receiver chain provides the signal processing for the received RF signals and includes both analog and digital blocks. Digital receiver (DRX) block provides RF signal processing in the digital domain. FIG. 1 illustrates the DRX architecture 100 including 9 blocks in the feed-forward path for GGE application. The DRX operates at two clock domains: channel-dependent ckvd64; and fixed ckres4X. These clock domain are bridged by the resampler (RES) 101. The Rate Change Filter (RCF1) 102 and Pre-Filter (PREF) 103 are located before RES 101. These blocks are driven by the ckvd64 clock derived from digital local oscillator (DLO). The other blocks operate at channel independent ckres4X clock domain and include a decimation finite impulse response (FIR) filter (RES) 104, IQMC computation engine (IQMC_CE) 105, residual offset cancellation infinite impulse response (IIR) filter (ROC_IIR) 106, zero-IF filter (ZIF) 107, channel select filter (CSF) 108 and droop cancellation filter (DCF) 109. The ROC_IIR can also be configured as high-pass (HPF) or low-pass (LPF) filters. The connection between these filters should be reconfigurable and it is currently implemented by a dedicated multiplexer block in DRPe. These blocks are referred as Fixed-rate Digital RX (FDRX) data path.

The current fixed-rate filtering blocks in the receiver chain (FDRX) of the digital radio processor (DRP) is implemented using fixed logic with very limited programmability. This makes it difficult to extend to support multi-standard wireless applications including GSM/GPRS/EDGE/WCDMA. Simply modifying the current GGE (GSM/GPRS/EDGE) FDRX by increasing the clock frequency cannot meet the WCDMA's sampling rate of 7.84 Msps without architectural change in those computationally-intensive blocks. Employing multiple dedicated data paths to cover these different standards would increase the area in proportion to the number of data paths. The flexibility problem needs to be resolved for the future multi-standard DRP products since providing both flexibility and performance is important for the low-cost 2G/2.5G/3G radio processors targeting the emerging market.

Currently the FDRX blocks shown in FIG. 1 are implemented by a fixed logic architecture. Each block operates at multiple clock domains to meet the data rate requirement of 1.083 Msps in GGE application. In this application specific integrated circuit (ASIC) each block is highly crafted to achieve the maximum efficiency in performance, area and power. The biggest pitfall of the fixed-logic architecture is the lack of configurability. Only limited intra-block connectivity is provided by the hardware multiplexes. This becomes worse when the DRP goes into 3G, where both 16-bit GGE and 8-bit/16 bit WCDMA modes are supported. Although WCDMA has less data width compared with GGE, its data path have different configurations which brings more complexity to the fixed-logic architecture. Supporting multiple wireless protocols on the same platform is becoming a natural trend with an increasing number of wireless applications. This requires maximum reconfigurability of FDRX to meet the data rate requirement.

Processor-based architecture has good flexibility and is controlled by instructions which share the common instruction fetch and decode logic. The execution of each instruction takes place in a heterogeneous functional unit. Most RISC processors are based on a load-store architecture, where memory access can only be implemented by a load (LD) instruction or a store (ST) instruction. This architecture simplifies the memory interface and the instruction set to achieve high operating frequency and throughput.

The trade-off in the general purpose processors is flexibility at the sacrifice of performance. In an experiment the GGE FDRX data path including the seven blocks illustrates in FIG. 1 was ported onto a 32-bit 8-issue high-performance general purpose DSP, the Texas Instruments TMS320C6201. The simulated sustaining data rate was only 90.49 Ksps, which is 11.96 times lower than the GGE requirement of 1.083 Msps under a 200 MHz clock frequency without any hardware customizations. Some customization of the processor's data path with application specific instructions is required to meet the performance requirement. This reduces the cycle count for computations in the FDRX critical path needed to meet the performance requirement. The customization of instructions doesn't reduce the processor's flexibility, but it provides a highly reconfigurable FDRX platform for the multi-mode 3G applications.

SUMMARY OF THE INVENTION

This invention is an application specific instruction set processor (ASIP) targeting the high rate FDRX supporting both 16-bit GGE and 8-bit/16 bit WCDMA applications. This ASIP architecture is a modification of a simple RISC with 16-bit instruction width and 32-bit data width by adding multiple custom functional units (ADU) into its data path. The tight coupling between each ADU and the processor core's fetch and decode logic makes it possible to implement each FDRX-specific operation, which would require multiple cycles in the general purpose processor's ALU. Designers can implement the FDRX with arbitrary configurations among different blocks shown in FIG. 1 using these custom instructions. The support of 8-bit/16-bit GGE/WCDMA FDRX is provided by the custom 8-bit multiplier array, which can be configured to perform 4 8-bit multiplications or 1 16-bit multiplication via custom instructions. The ADU also provides single-cycle 8-bit/16-bit vector processing on the I/Q samples in both real and complex domains.

In addition to these single-cycle custom instructions defined in this FDRX ASIP, this invention proposes several multi-cycle FFIR instruction to accelerate the multi-tap (up to 64) FIRs in the FDRX path. The execution of this FFIR instruction happens in the FILT ADUs, which has its local sequencer to fetch data from local register file or shared data memory (DMEM). The control word register (CR) in FILT provides the starting address of each execution of FFIR instruction, and custom instructions FLD and FST provide write and read the CR from and to the DMEM. In this FDRX ASIP other instructions can execute in parallel with the multi-cycle FIR instruction since the fetch/decoding logic of the processor core becomes available after the FIR starts execution under its local sequencer. A flag in FILT unit provides the running status of the multi-cycle FFIR instruction, and it will be employed by the processor scoreboard logics to resolve data/resource/control dependencies. This feature permits scheduling some FDRX functions when an FFIR instruction is executing. After detailed scheduling, it is possible to port all FDRX computational blocks for both GGE and WCDMA applications onto the ASIP solution by this dynamic parallel processing capability. Both GGE and WCDMA applications them meet the challenging data rate requirements, which cannot be met even using 8-issue high-performance 32-bit DSP.

This invention includes a two-stage baseline 16-bit RISC core providing basic instruction fetch and decode logic, and multiple custom functional units (ADU) which are tightly coupled to it. Preferably the following ADUs are proposed for the GGE/WCDMA FDRX:

(1) SAM unit: buffers incoming samples and interacts with register move instructions to stall such a move from the buffer if the data is not valid, with the buffer depth reconfigurable between low-rate GGE and high-rate WCDMA applications;

(2) IIR8 unit: a dedicated single-cycle vectored 8-bit IIR processing capability for WCDMA ROC algorithm;

(3) IIR16 unit: a dedicated single-cycle 16-bit reconfigurable LPF/HPF IIR processing capability for GGE ROC algorithm;

(4) CDU unit: a multiple single-cycle complex and vector processing capability on both 8-bit and 16-bit data which implements a 16×16 multiplier by distributed 8-bit multipliers or implements a 16 by 16 multiply directly;

(5) SHV unit: a single-cycle vectored data shifter on both 8-bit and 16-bit data which implements a general shift instruction whose shifting direction depends on the sign of the source register value;

(6) FILT unit: a multi-cycle FIR processing capability for both 8-bit and 16-bit I/Q sample vectors for GGE/WCDMA which supports multiple FIR types including symmetrical/asymmetrical and real/complex by two vector computation units (VCU) containing multiple 8-bit multipliers with a 5-stage pipelined and dedicated multi-port register file and local sequencer to accelerate the multi-tap FIRs;

(7) APE unit: a dedicated single-cycle priority encoding algorithm unit for the IQMC_AE block; and (8) LUT unit: is a lookup table for sine and cosine functions that generates a tone in the IF frequency for the GGE ZIF (zero-IF) down-conversion block.

Each ADU is highly customized for accelerating computation intensive tasks in FDRX signal path. These tasks include multi-tap FIRs, IIRs, complex domain and vectored data processing. Custom instructions based on load-store architecture are defined to manipulate these ADUs and the whole FDRX data path can be easily implemented by the software employing these custom instructions.

This ASIP architecture exploits a parallel execution to further reduce the execution cycles. When a multi-cycle FIR instruction starts its local sequencer during the EX stage, the main processor continues fetching/decoding and executing the instructions following the FIR instruction if the scheduled code has no data or resource dependency. By partitioning the algorithm, the worst-case FDRX data path is estimated to achieve 10.81 Msps sampling rate for WCDMA applications and 1.33 Msps sampling rate for GGE applications with an ASIP main clock frequency of 135 to 275 MHz.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
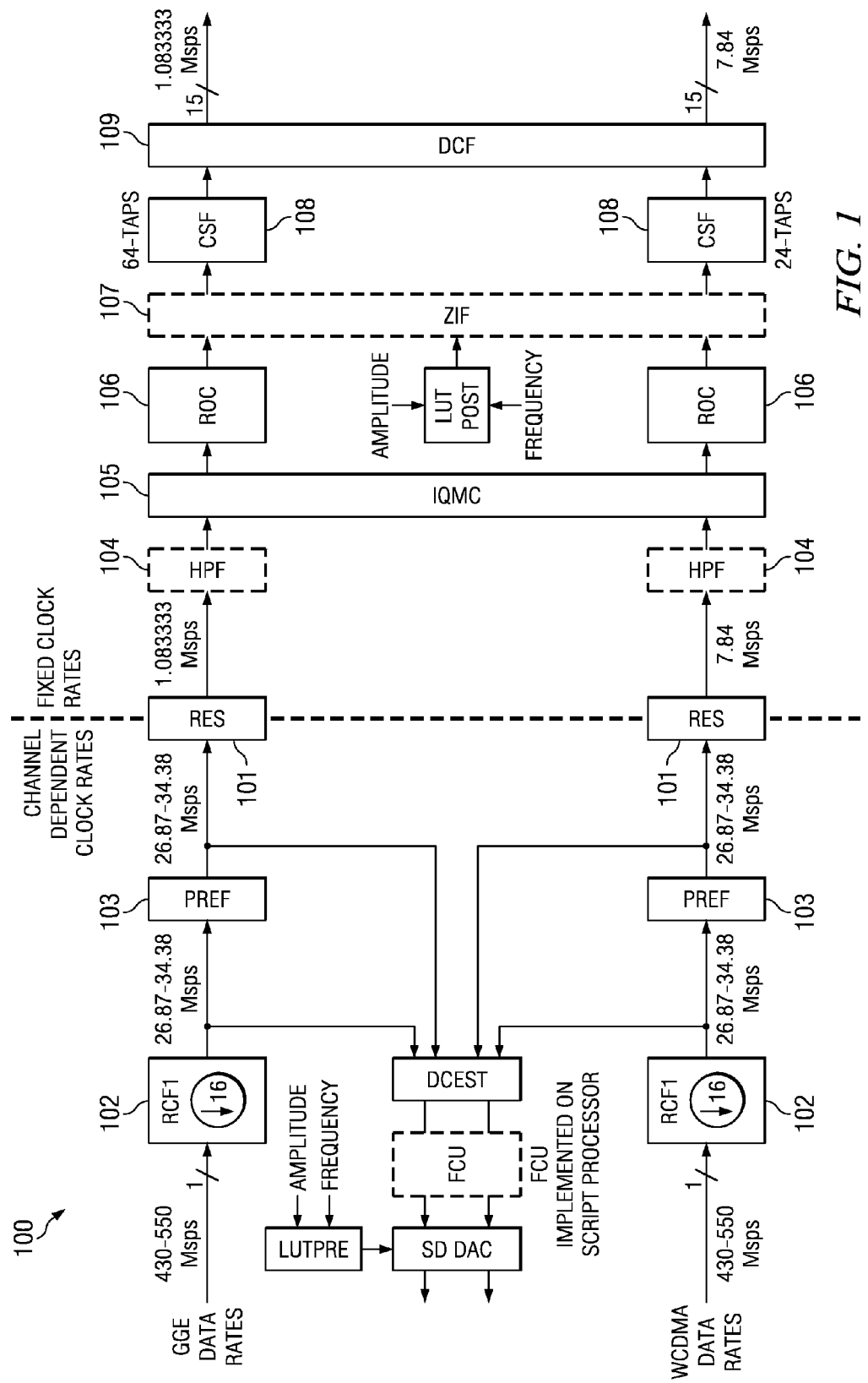
FIG. 1 illustrates the DRX architecture 100 including 9 blocks in the feed-forward path for GGE application.
Figure 2:
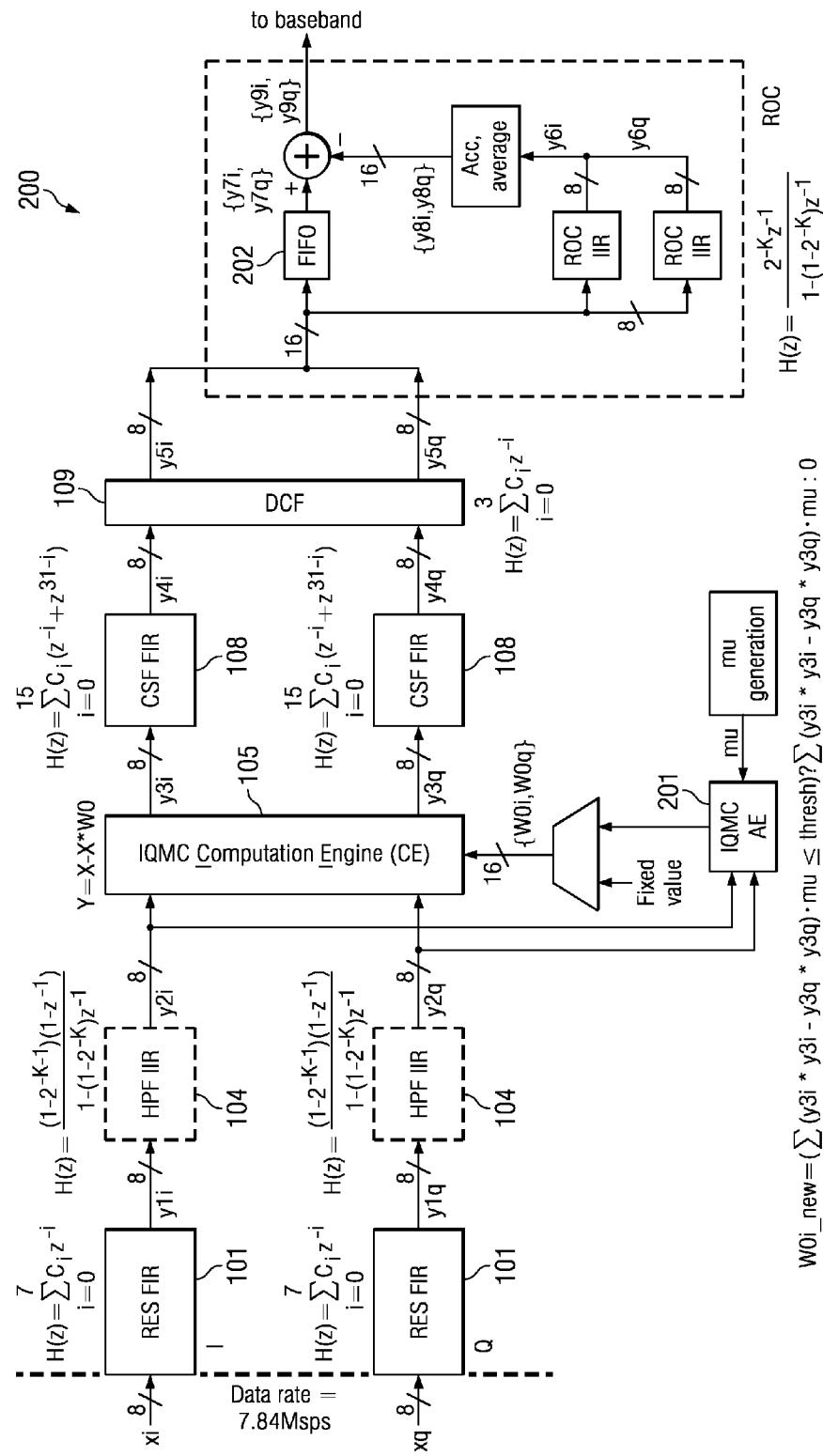
FIG. 2 illustrates the full FDRX for 8-bit WCDMA.
Figure 3:
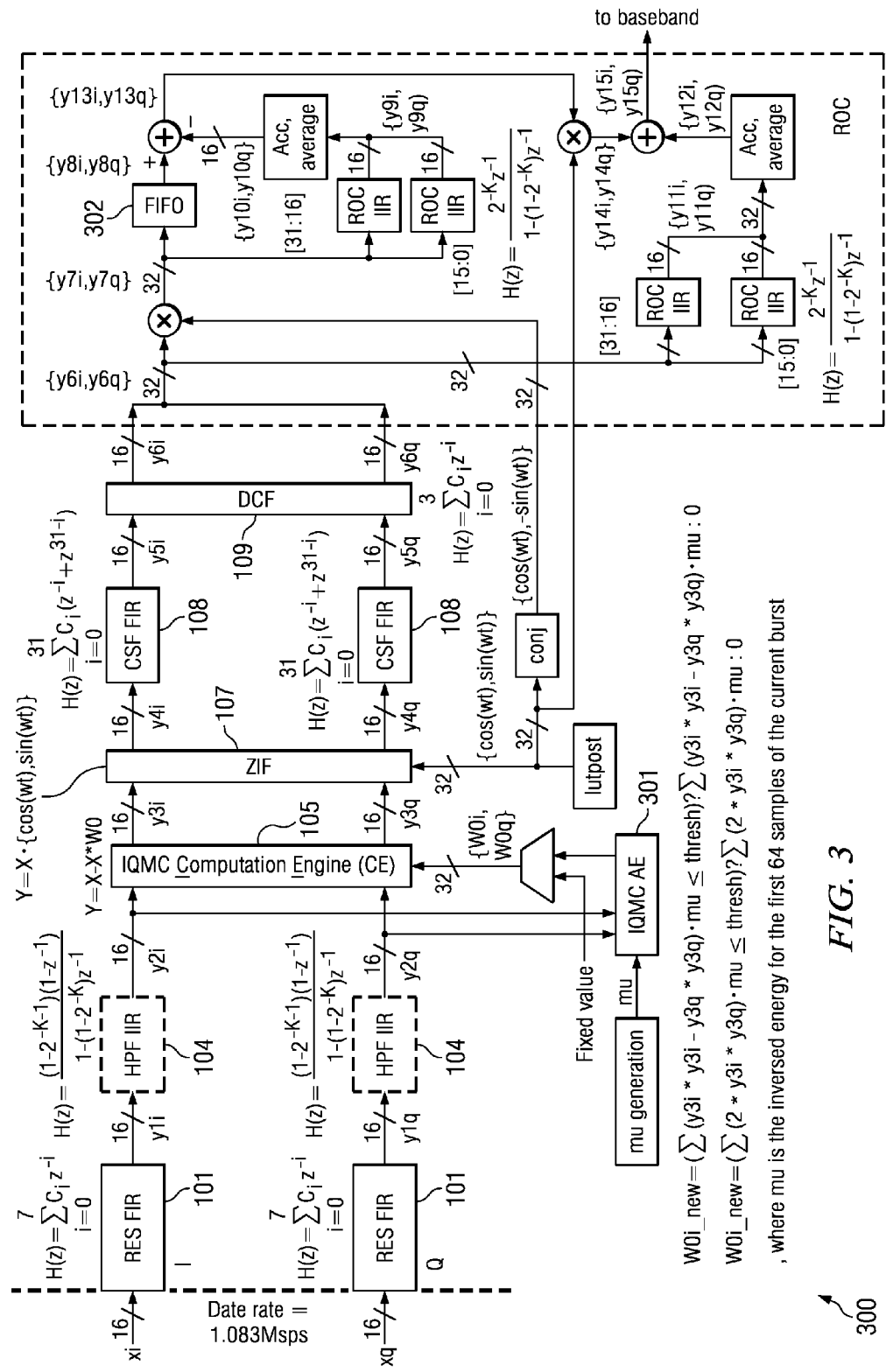
FIG. 3 illustrates the full FDRX for 16-bit GGE.

FIG. 2 illustrates the full FDRX for 8-bit WCDMA. FIG. 3 illustrates the full FDRX for 16-bit GGE. Both FIG. 2 and FIG. 3 include the additional two functional blocks: IQMC_AE (IQ Mismatch Adaptive Engine) 201 and 301; and ROC (Residual Offset Cancellation) 202 and 302. Since the data paths are highly reconfigurable, FIGS. 2 and 3 show one worst case in WCDMA and GGE where all blocks are present. The formula on each block shows the corresponding transfer function in the z-domain for is a digital filter (FIR or IIR). For IQMC_CE 105 and IQMC_AE 201 and 301, the algorithms are expressed in the time domain with complex computations.

Assume the input to the FDRX is a vector $\{xi, xq\}$ and each component is represented by 8-bit signed integer. The output on each of the ten blocks is labeled on FIG. 2. The computation on each block is presented in the time domain in the following:

(1) RES 101 performs the 8-tap decimation real FIR for both I and Q channels:

$$y1i[n] = \sum_{i=0}^{7} c_i xi[7-i], \quad (1)$$

$$y1q[n] = \sum_{i=0}^{7} c_i xq[7-i]$$

(2) HPF_IIR 104 performs 1-pole, 1-zero real IIR for both I and Q channels:

$$\begin{cases} y2i[n] = (1-2^{-K})y2i[n-1] + (1-2^{-K-1})(y1i[n]-y1i[n-1]) \\ y2q[n] = (1-2^{-K})y2q[n-1] + (1-2^{-K-1})(y1q[n]-y1q[n-1]) \end{cases} \quad (2)$$

(3) IQMC_CE 105 performs complex multiplication with conjugation and complex subtraction on the composite I/Q samples:

$$\{y3i, y3q\} = \{y2i, y2q\} - \{y2i, y2q\} * \{W0i, W0q\} \quad (3)$$

(4) CSF 108 performs 32-tap symmetrical real FIR for both I and Q channels:

$$y4i[n] = \sum_{i=0}^{15} c_i(y3i[i] + y3i[31-i]), \quad (4)$$

$$y4q[n] = \sum_{i=0}^{15} c_i(y3q[i] + y3q[31-i])$$

(5) DCF 109 performs 4-tap complex FIR for the composite I/Q samples:

$$\{y5i, y5q\} = \sum_{i=0}^{3} C_i \times \{y4i, y4q\}, \quad (5)$$

where $$C_i = \{ci_i, cq_i\}$$

(6) IQMC_AE 201 performs the adaptive engine for updating the coefficient W0 for the next burst:

$$b_1 = \Sigma(y3i \cdot y3i - y3q \cdot y3q) \cdot mu;$$

$$b_2 = \Sigma(2 \cdot y3i \cdot y2q) \cdot mu$$

$$W0i\_new = (b_1 \leq threshold)?b_1:0$$

$$W0q\_new = (b_2 \leq threshold)?b_2: \quad (6)$$

This calculation will not start until the sixty fourth sample during one burst. The mu generation logic needs 64 samples to estimate the inversed energy to get mu ready. At the beginning of each new burst, the following updating will be performed before IQMC_CE starts:

$$W0i = W0i\_new$$

$$W0q = W0q\_new \quad (7)$$

(7) ROC DC 202 estimation, accumulation and cancellation:
For the first 64 samples from DCF output {y5i, y5q}:
(7.1) Push {y5i, y5q} into a 64-entry FIFO
(7.2) Perform one-pole, one-zero IIRs on both I and Q channels:

$$\begin{cases} y6i[n] = (1-2^{-K})y6i[n-1] + 2^{-K}y5i[n-1] \\ y6q[n] = (1-2^{-K})y6q[n-1] + 2^{-K}y5q[n-1] \end{cases} \quad (8)$$

(7.3) Accumulate the IIR output: {Σy6i,Σy6q}
(7.4) Right-shift the accumulation value by 6-bits to get the average DC over the 64 samples:

$$\{y8i, y8q\} = \{(\Sigma y6i) >> 6, (\Sigma y6q) >> 6\} \quad (9)$$

For the remaining samples inside an RX burst:
(7.5) Pop data from FIFO to {y7i, y7q}:
(7.6) Subtract {y7i,y7q} from the average DC estimation {y8i,y8q}, and this is the final result that goes to the baseband:

$$\{y9i, y9q\} = \{y7i, y7q\} - \{y8i, y8q\} \quad (10)$$

Formulas (1) to (10) compose the algorithm model of the full FDRX data path, which requires the following number of 8-bit multiplications for processing each I/Q sample assuming that the multiplications in those IIRs are implemented by right-shifting:

$$N_{cycle,WCDMA} = N_{RES\_FIR} + N_{IQMC\_CE} + N_{IQMC\_AE} +$$

$$N_{CSF} + N_{DCF}$$

$$= 16 + 4 + 4 + 64 + 16$$

$$= 104$$

Given the WCDMA sampling rate requirement of 15.36 Msps after applying 100% margin and a processor operating frequency of 200 MHz, this yields a lower bound of the number of 8-bit multiplications completed each clock cycle of:

$$\overline{N_{cycle,WCDMA}} = \lceil N_{cycle,WCDMA} \times 15.36/200 \rceil = 8$$

The GGE FDRX data path is similar to WCDMA's with the following four changes:
  (1) Data width is extended from 8-bit to 16-bit;
  (2) CSF (Channel Select Filter) is enlarged to 64-tap;
  (3) ZIF block is added to convert the RX data from low-IF to zero-IF;
  (4) Updated ROC data path with additional ZIF blocks.
The computation on each block is presented in the time domain in the following:
  (1) RES 101 performs the 8-tap decimation real FIR for both I and Q channels:

$$y1i[n] = \sum_{i=0}^{7} c_i xi[7-i], \quad (11)$$

$$y1q[n] = \sum_{i=0}^{7} c_i xq[7-i]$$

(2) HPF_IIR 104 performs 1-pole, 1-zero real IIR for both I and Q channels:

$$\begin{cases} y2i[n] = (1-2^{-K})y2i[n-1] + (1-2^{-K-1})(y1i[n]-y1i[n-1]) \\ y2q[n] = (1-2^{-K})y2q[n-1] + (1-2^{-K-1})(y1q[n]-y1q[n-1]) \end{cases} \quad (12)$$

(3) IQMC_CE 105 performs complex multiplication with conjugation and complex subtraction on the composite I/Q samples:

$$\{y3i, y3q\} = \{y2i, y2q\} - \{y2i, y2q\}^* \{W0i, W0q\} \qquad (13)$$

(4) ZIF 107 performs 16-bit complex multiplication with the tone generated from LUTPOST:

$$\{y4i, y4q\} = \{y3i, y3q\} \times \{\cos(wt), \sin(wt)\} \qquad (14)$$

(5) CSF 108 performs 64-tap symmetrical real FIR for both I and Q channels:

$$y5i[n] = \sum_{i=0}^{31} c_i(y4i[i] + y4i[63 - i]), \qquad (15)$$

$$y5q[n] = \sum_{i=0}^{31} c_i(y4q[i] + y4q[63 - i])$$

(6) DCF 109 performs 4-tap complex FIR for the composite I/Q samples:

$$\{y6i, y6q\} = \sum_{i=0}^{3} C_i \times \{y5i, y5q\}, \qquad (16)$$

where $$C_i = \{ci_i, cq_i\}$$

(7) IQMC_AE 301 performs the adaptive engine for updating the coefficient W0 for the next burst:

$$b_1 = \Sigma(y3i \cdot y3i - y3q \cdot y3q) \cdot mu;$$

$$b_2 = \Sigma(2 \cdot y3i \cdot y2q) \cdot mu$$

$$W0i\_new = (b_1 \leq threshold)?b_1:0$$

$$W0q\_new = (b_2 \leq threshold)?b_2:0 \qquad (17)$$

$$W0i = W0i\_new$$

$$W0q = W0q\_new \qquad (18)$$

This calculation will not start until the sixty fourth sample during one burst. The mu generation logic needs 64 samples to estimate the inversed energy to get mu ready. At the beginning of each new burst, the following updating will be performed before IQMC_CE starts:

(8) ROC DC 302 estimation & accumulation:
(8.1) Perform a complex multiplication on the DCF output with $\{\cos(wt), -\sin(wt)\}$:

$$\{y7i, y7q\} = \{y6i, y6q\} \times \{\cos(wt), -\sin(wt)\} \qquad (19)$$

For the first 64 samples from DCF output $\{y6i, y6q\}$:
(8.2) Perform one-pole, one-zero IIRs on the DCF output and $\{y7i, y7q\}$:

$$\begin{cases} y11i[n] = (1 - 2^{-K})y11i[n-1] + 2^{-K}y6i[n-1] \\ y11q[n] = (1 - 2^{-K})y11q[n-1] + 2^{-K}y6q[n-1] \end{cases} \qquad (20)$$

$$\begin{cases} y9i[n] = (1 - 2^{-K})y9i[n-1] + 2^{-K}y7i[n-1] \\ y9q[n] = (1 - 2^{-K})y9q[n-1] + 2^{-K}y7q[n-1] \end{cases} \qquad (21)$$

(8.3) Accumulate the two IIRs' outputs:

$$\{\Sigma y11i, \Sigma y11q\}, \{\Sigma y9i, \Sigma y9q\}$$

(8.4) Right-shift the accumulation value by 6-bits to get the average DC over the 64 samples:

$$\{y12i, y12q\} = \{(\Sigma y11i) >> 6, (\Sigma y11q) >> 6\} \qquad (22)$$

$$\{y10i, y10q\} = \{(\Sigma y9i) >> 6, (\Sigma y9q) >> 6\} \qquad (23)$$

For the remaining samples inside an RX burst:
(8.5) Pop data from FIFO to $\{y8i, y8q\}$:
(8.6) Subtract $\{y8i, y8q\}$ from the average DC estimation $\{y10i, y10q\}$ to get the partial result:

$$\{y13i, y13q\} = \{y8i, y8q\} - \{y10i, y10q\} \qquad (24)$$

(8.7) Perform the $2^{nd}$ ZIF on the partial result from (8.6):

$$\{y14i, y14q\} = \{y8i, y8q\} \times \{\cos(wt), \sin(wt)\} \qquad (25)$$

(8.8) Subtract $\{y14i, y14q\}$ from the $2^{nd}$ average DC estimation $\{y12i, y12q\}$ to get the final result sent to base band:

$$\{y15i, y15q\} = \{y14i, y14q\} - \{y12i, y12q\} \qquad (26)$$

Formulas (II) to (26) summarize the algorithm model of the full FDRX data path, which requires the following number of 16-bit multiplications for processing each I/Q sample assuming that the multiplications in those IIRs are implemented by right-shifting:

$$\begin{aligned} N_{cycle,GGE} &= N_{RES\_FIR} + N_{IQMC\_CE} + N_{IQMC\_AE} + N_{CSF} + \\ &\quad N_{DCF} + 3N_{ZIF} \\ &= 16 + 4 + 4 + 128 + 16 + 3 \times 4 \\ &= 180 \end{aligned}$$

Assume each 16-bit multiplication consists of 4 8-bit multiplications, it needs 720 8 by 8 multiplications to finish one sample's processing for GGE FDRX path. Given the GGE sampling rate requirement of 2.166 Msps after applying 100% margin and a processor operating frequency of 200 MHz, yields a lower bound of the number of 8-bit multiplications finished in one clock cycle of:

$$\overline{N_{cycle,GGE}} = [N_{cycle,GGE} \times 4 \times 2.166/200] = 8$$

Combining the analysis for the WCDMA FDRX and the GGE FDRX path give a lower bound of 8 for the number of 8-bit multiplications needed each clock cycle to meet WCDMA and GGE sampling rate requirements with 100% margin. Adding more hardware resource has the potential to increase the performance further, but it would be a good design practice to use minimum hardware for the area saving's perspective. Actually this lower bound is based on the assumption that each clock cycle is fully utilized for multiplications for those non-IIR blocks, and this assumption is hard to meet in the actual design since there are data dependences resulting in some cycles overhead where multiplications cannot execute in the FDRX data paths shown in FIGS. 2 and 3. Based on this quantitative computational requirement analysis, this invention is an ASIP architecture utilizing multiple 8-bit multipliers to fulfill the DRX performance requirement.

Figure 4:
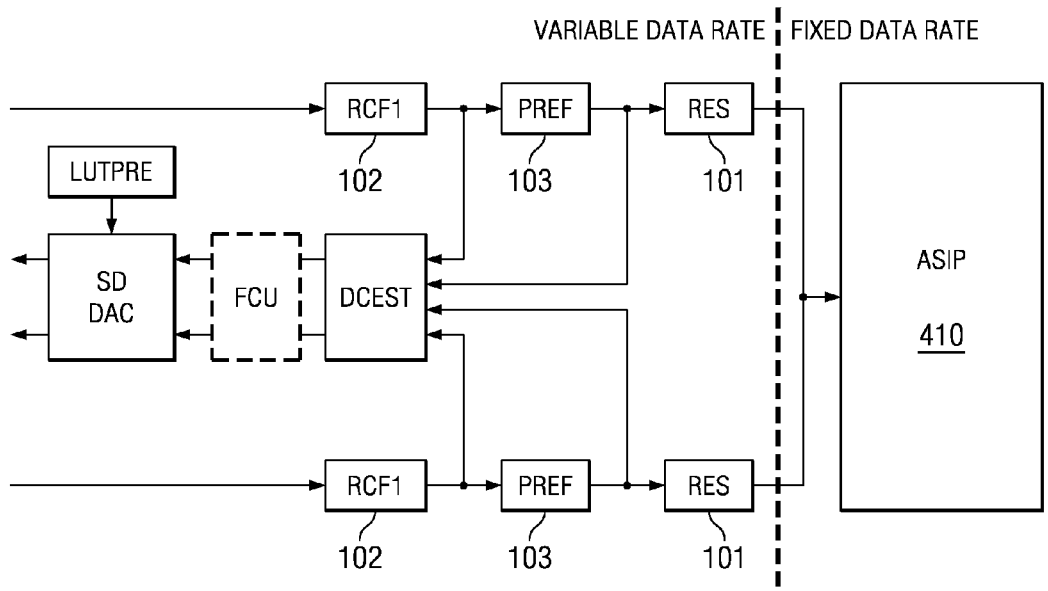
FIG. 4 illustrates using an ASIP to take over the FDRX algorithms.

FIG. 4 illustrates using an ASIP 410 to take over the FDRX algorithms. FIG. 4 mainly shows the interface of the ASIP and other DRP blocks. The data output from RES 101 at variable clock domain goes into ASIP's SAM unit 411. SAM unit 411 buffers the sample and generates the appropriate events and interrupts to trigger the execution of the software. The signal processing algorithms of FDRX illustrated in FIGS. 2 and 3 are handled by software execution. In FIG. 4 temporary results are stored in the processor 410's 8-entry 32-bit architectural register file 530 or data memory 520. Multiple custom functional units IIR16 543, CDU 544, S-unit 552, L-unit 551 are tightly coupled with the processor's data path to provide single-cycle processing capability. ASIP 410 operates on instructions stored in program memory 510. These are fetched by instruction fetch unit 511 and decoded by decode unit 512. Control registers (CREGs) 513 provides the processor's status information during instruction execution in these functional units 546, 541, 545, 543, 547, 544, 542, 548, 551, 552, 553. System interface 440 controls access to off-chip peripherals. Arbiter 525 controls access to data memory 520.

Due to the sequential execution nature and the fact that generally only one instruction can execute at a time, each filter block in FIGS. 2 and 3 cannot start until its previous one finishes. Each sample of a group of sampled needs to traverse through the whole FDRX data path before the next sample comes if the algorithm is implemented by programmable data processor. A custom memory-mapped register (RX_BB) 524 stores the computation result of ASIP. This register is also mapped onto off-chip peripheral (OCP) memory space so that the script processor (which is preferably an ARM Cortex-M3) and base band processor (which is preferably an ARM7 or ARM9) can access it to conduct other RX DSP algorithms.

Figure 5:
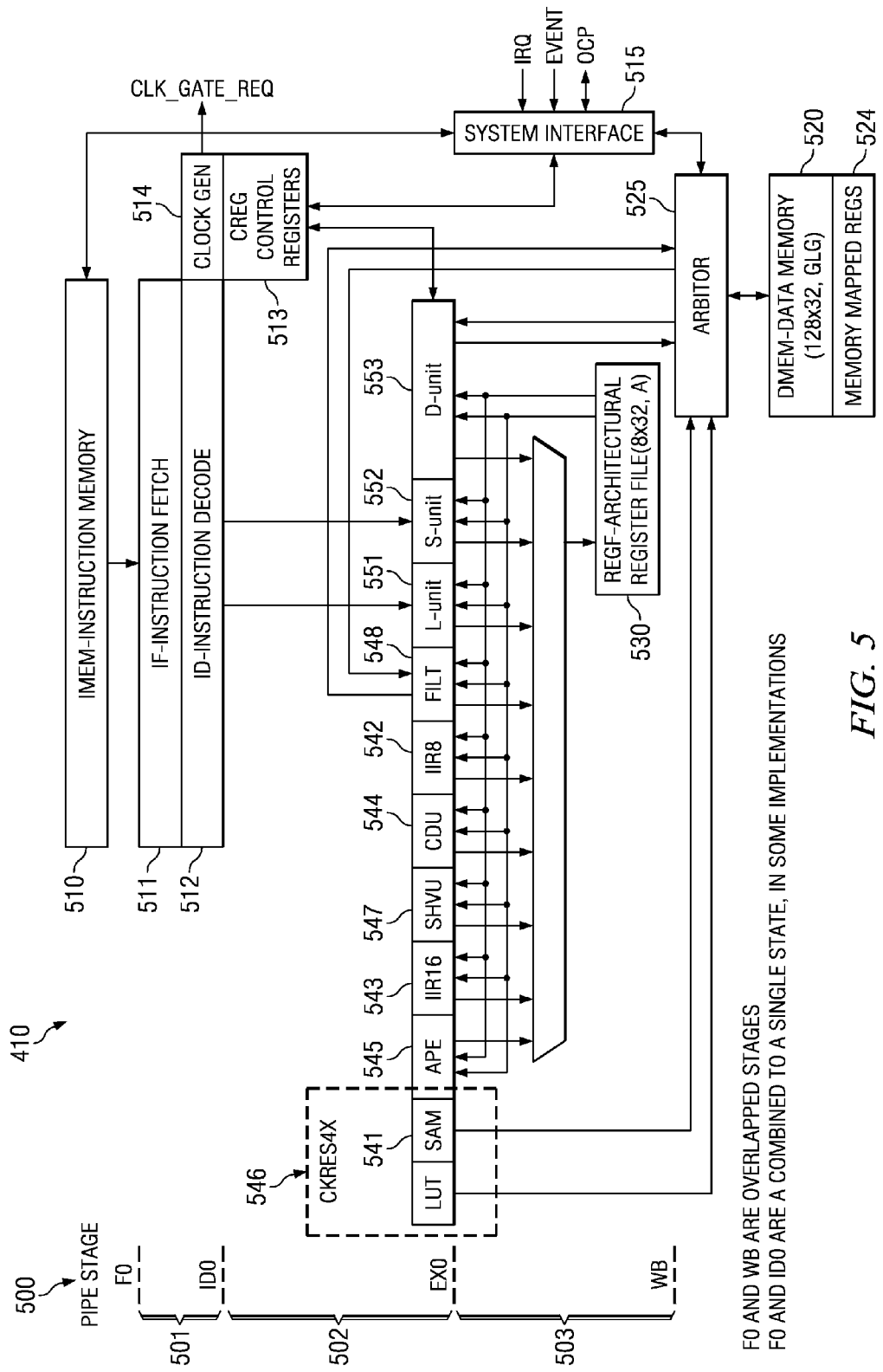
FIG. 5 illustrates the architectural details of the FDRX ASIP 440.

FIG. 5 illustrates the architectural details of the FDRX ASIP 440. This processor is based on a simple 16-bit Torrent RISC architecture featuring a two-stage pipeline 500 including IF_ID (instructions fetch/decode) stage 501 and EX (execution) stage 502. An additional WB (write back) stage 503 is inserted after EX stage 502 for the memory load instructions. A 256 by 16 instruction memory (IMEM) 510 provides the storage of FDRX software, which is downloaded from OCP via the system interface 515 during DRP initialization sequence. Another 128 by 32 shared data memory (DMEM) 520 including memory mapped register 524 is used to provide the data storage for the intermediate and final calculation results. An 8-entry 32-bit architectural register file (R0 to R7) 530 provides the local data storage for those frequently accessed data to reduce the cycle overhead resulting from memory accesses. This ASIP's data path differs from other data processors by multiple dedicatedly designed functional units (ADU) including SAM (sample unit) 541, IIR8 (8-bit parallel IIR unit) 542, IIR16 (16-bit LPF/HPF IIR unit) 543, CDU (complex data unit) 544, APE (priority encoding unit) 545, LUT (wave generation unit) 546, SHVU (vectored shifting unit) 547, FILT (FIR unit) 548. Each of these ADU implements one or multiple application specific instructions to accelerate the DSP functions noted in conjunction with FIGS. 2 and 3. These ADUs are tightly coupled with processor's data path and support direct register file access. This enables each ADU to finish the data processing generally in a single EX stage. An exception to this is FILT unit 548 which accelerates multi-tap FIR filters and required multiple cycles due to its internal pipeline structure. FILT unit 548 has its local sequencer and linear/cyclic address generator to fetch the data from DMEM 520 and its local register file to accelerate the multi-tap FIRs. Such multi-tap FIRs occupy more than 80% of the multiplications in both WCDMA and GGE FDRX paths. Architecting the local sequencer in FILT unit 548 liberates the processor's instruction fetch/decode logic for other single-cycle instructions when FILT unit 548 is running and reduces the number of instructions fetched for FIR computation. The resulting reduced instruction fetching lowers the power consumption of IMWM 510. ARIP 410 also includes ordinary structures: instruction fetch unit 511 which fetches instructions from IMEM 510; instruction decode unit 512 which decodes these instructions to control these ADU's; and arbitrator 525 which controls access the DMEM 520. The computational function units also include ordinary structures: L-unit 551; S-unit 552; and D-unit 553. L-unit 551 performs logical, shift, rotate and bit manipulation data processing operations. S-unit 552 performs data move operations. D-unit 553 performs arithmetic data processing operations as well as data load from memory, data store to memory, program branch operations and stack pointer increment/decrement for PUSH/POP and CALL/RETURN instructions.

Two ADUs SAM unit 541 and LUT unit 546 operate in two clock domains: the sample clock cksam (1.083 MHz for GGE and 7.84 MHz for WCDMA); and ASIP main clock (135 to 275 MHz). Resamplers are employed to bridge between these two clocks domains to resolve the meta-stability issue. The triggering of these two ADUs is the rising edge of the sampling clock synchronized to the processor clock. Each ADU has 32-bit memory-mapped registers to store results. These registers are accessible by the ASIP's general or custom load instructions.

The other six ADUs including IIR8 unit 542, IIR16 unit 543, CDU 544, APE unit 545, SHVU 547 and FILT 548 operate at processor 135 to 275 MHz clock domain and are accessed by the custom instructions. These custom instructions are fetched from IMEM 510 and decoded to select the appropriate ADU at IF_ID stage 501. Data is read from the source registers specified in these custom instructions. During EX stage 502, the computation is performed on the selected ADU and the result will be written back to the destination register in register file 530. From the programmer's point of view, there is no difference between these custom instructions and general purpose instructions.

Arbiter 525 provides arbitration between FILT unit 548 and D-unit 553, which both have access to single-port DMEM 520. Preferably FILT unit 548 has higher priority than D-unit 553 so that the memory access for the multi-tap FIR instruction will always be granted first. In the case that both FILT unit 548 and D-unit 553 access DMEM 520 simultaneously, the corresponding load (LD) or store (ST) instruction of D-unit 553 stall until the load/store operation of the FIR instruction completes.

Figure 6:
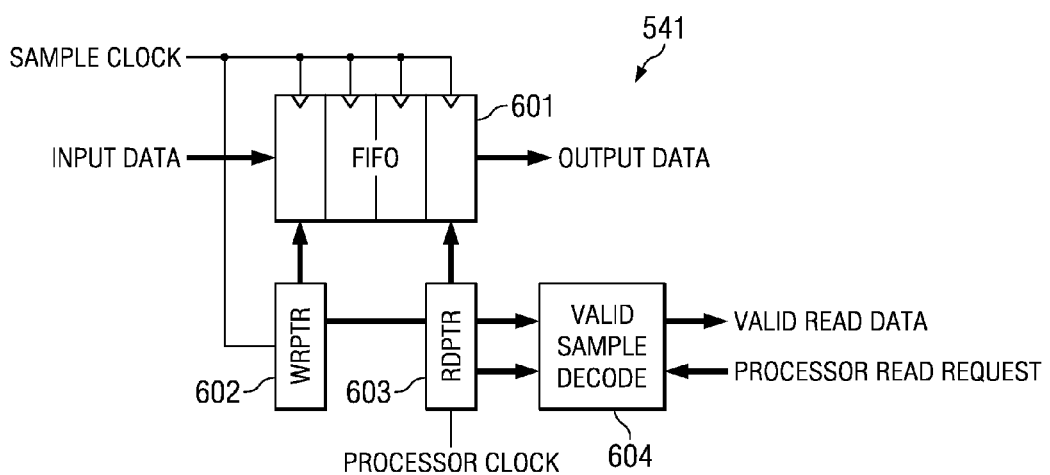
FIG. 6 illustrates the internal construction of SAM unit.

FIG. 6 illustrates the internal construction of SAM unit 541. SAM unit 541 receives the data sample from the RES output, provides appropriate buffering and output data synchronized to the processor clock SAM unit 541 operates at two clock domains: sample clock cksam; and a processor clock. Input data is stored in first-in-first-out (FIFO) buffer 601 in synchronism with the sample clock. Write pointer register 602 directs the storage address in FIFO buffer 601. Write pointer register 602 increases by 1 on each rising edge of the sample clock in a circular fashion. Read pointer register 603 increases by 1 on each rising edge of the processor clock when a custom load instruction is successfully decoded and executed. FIFO buffer 601 is read from a read address provided by read pointer register 603 to generate the data output of SAM unit 541. Valid sample decode logic 604 compares read pointer register 602 and write pointer register 603. Valid sample decode logic 604 causes FIFO buffer 601 to generate output data by reading FIFO buffer 601 from the location indicated by read pointer register 603. This read data is synchronized to the processor clock. The custom move instruction stores this output data in an instruction specified destination register in register file 530.

For low-rate GGE applications, the circular updating of write pointer register 602 and read pointer register 603 may be limited to less than the whole of FIFO buffer 601. In the preferred embodiment WCDMA uses four registers in FIFO buffer 601. GGE applications typically use just one register within FIFO buffer 601. The three unused registers are preferably not powered to save power.

Figure 7:
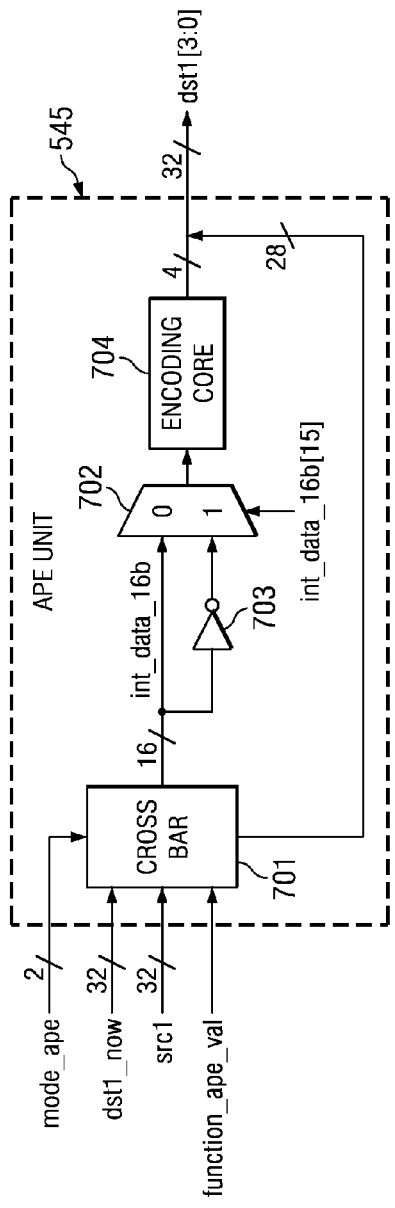
FIG. 7 illustrates the internal construction of APE unit.

FIG. 7 illustrates the internal construction of APE unit 545. APE unit 545 calculates the 4-bit encoded inverse of input sample energy. APE unit receives a 32-bit input operand scr1. A 2-bit control signal (func) selects one of the three modes: APE8; APE8H; and APE16. The first two modes encode the bits [15:8] and [31:24] for the 8-bit WCDMA application. This data may be scaled from 8-bit to 16-bit. The last mode encodes bits [31:16] for the 16-bit GGE application. Crossbar 701 selects the appropriate bits according to the mode selected by the func signal. The 16 bits selected are zero filled for the 8-bit WCDMA modes. Multiplexer 702 selects these bits or the bit-wise inverted bits from inverter 703 depending on the sign of these bits. Inverter 703 approximates the magnitude of the input signal when it is a negative number. Encoding core 704 looks for the first non-zero bit starting from the MSB and then assigns it a 4-bit code, which is accumulated and averaged to estimate the inverse of energy. The 4-bit unsigned output will be stored in bits [3:0] of dst1 register at the end of EX stage 502. The remaining 28 bits to be stored in the destination register are supplied unchanged from the source data via cross bar 701.

Figure 8:
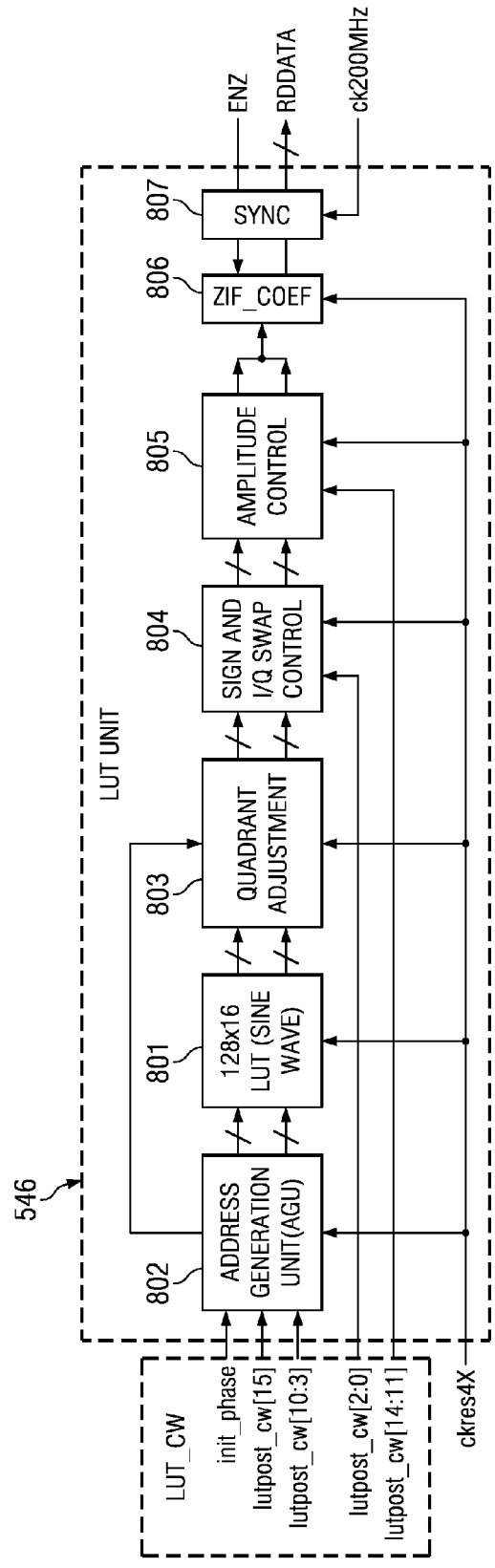
FIG. 8 illustrates the internal construction of LUT unit.

FIG. 8 illustrates the internal construction of LUT unit 546. LUT unit 546 generates a tone containing 16-bit cosine and 16-bit sine components. LUT unit 546 is triggered by the incoming sample in the GGE application. In WCDMA applications, LUT unit 546 is disabled to save power. LUT unit 546 operates under two clock domains. The variable data rate clock cksam triggers the computation of the new coefficient once a new sample comes in. Processor clock is used for the ASIP load instruction which accesses ZIF_COEF register. A 128 by 16 ROM table 801 stores the first quadrant of a sine wave. 128 by 16 ROM table 801 enables derivation of all required waveforms under control of input control words. Address generator unit (AGU) 802 generates the 7-bit address vector to access 128 by 16 ROM table 801 to get the initial sine and cosine values in response to input control words init_phase, and lutpost_cw[15] and lutpost_cw[10:3]. These values are processed by quadrant adjustment unit 803, sign and I/Q swap control unit 804 responsive to lutpost_cw[2:0] and amplitude control unit 805 responsive to lutpost_cw[14:11]. The resulting waveform is stored in 32-bit memory-mapped register ZIF_COEF 806. Data thus stored in ZIF_COEF 806 may be accessed by a memory-mapped read operation. Synchronizer 807 synchronizes this read data to the processor clock.

Figure 9:
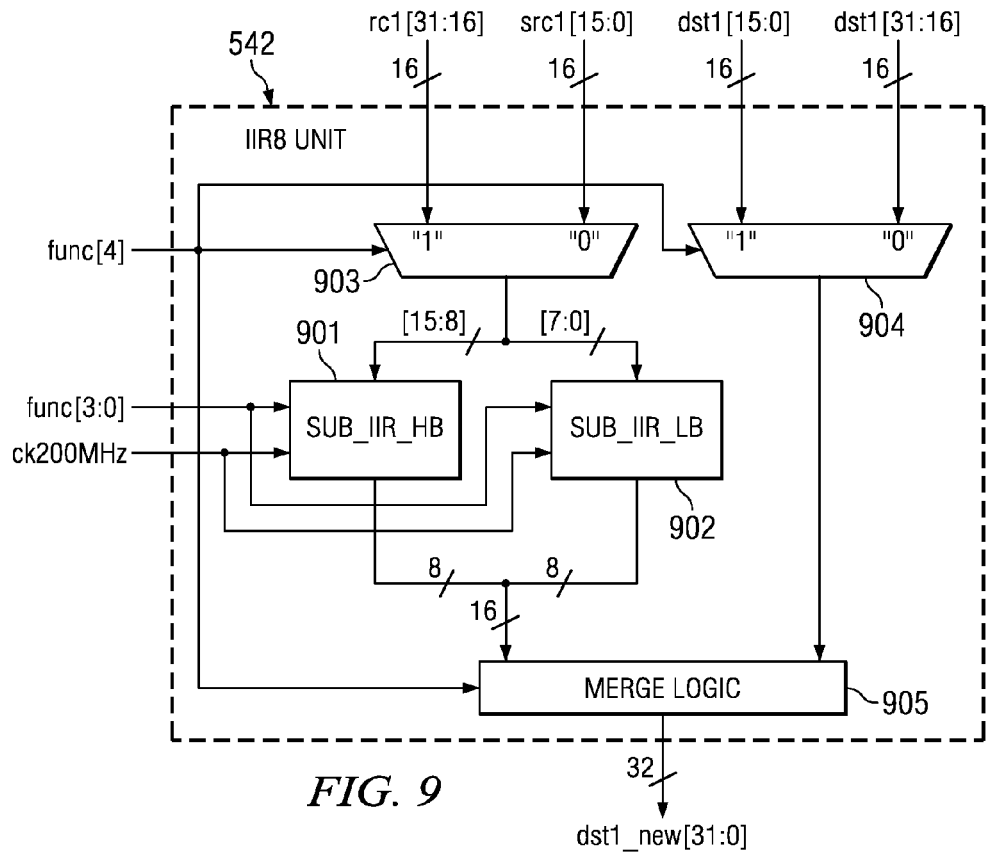
FIG. 9 illustrates the internal construction of IIR8 unit.

FIG. 9 illustrates the internal construction of IIR8 unit 542. IIR8 unit 542 provides processing for a 1-pole, 1-zero infinite impulse response (IIR) filter in a single EX stage in the WCDMA FDRX path. IIR8 unit 542 includes 2 identical SUB_IIR blocks, SUB_IIR_HB 901 and SUB_IIR_LB 902. Each SUB_IIR block is a reconfigurable 8-bit IIR filter controlled by 4 bits func[3:0]. The SUB_IIR control bits func[3:0] can select either low-pass (LPF) or high-pass (HPF) type IIRs. These have the following possible transfer functions:

for low pass filter $$H_1(z) = \frac{1 - 2^{-K}z^{-1}}{1 - (1 - 2^{-K})z^{-1}},$$

where $K = (3, 4, 5, 6, 7, 8, 9, 10)$, for high pass filter $$H_2(z) = \frac{(1 - 2^{-K-1})(1 - z^{-1})}{1 - (1 - 2^{-K})z^{-1}}$$

where $K = (3, 4, 5, 6, 7, 8, 9, 10)$

IIR8 unit 542 operates on the 16-bit WCDMA sample. SUB_IIR_HB 901 receives the MSB 8 bits (I channel), while SUB_IIR_LB 902 receives the LSB 8 bits (Q channel). The IIR feedback terms are stored in each SUB_IIR's internal registers addressed by 1-bit control signal. IIR8 unit 542 supports up to 2 different IIR transfer functions required for the FDRX's ROC cancellation algorithm.

In each SUB_IIR block, multiplication is implemented by right-shifting to save the hardware area since the possible K values in WCDMA applications are {3, 4, 5, 6, 7, 8, 9, 10}. Because of this IIR constraint, the right-shift can be implemented by hardwired data truncation and a 4-to-1 multiplexing without a barrel shifter. This saves chip area. A fifth control bit func[4] causes multiplexer 903 to select the MSB 16 bits scr[31:16] or the LSB 16 bits src[15:0] of 32-bit input src perform the IIR. This fifth control bit func[4] also controls multiplexer 904 to select the LSB 16 bits dst1[15:0] or the MSB 16 bits dst1[31:16] of 32-bit destination dst1. The results of SUB_IR_HB 901 and SUB_IIR_LB 902 are concatenated. Control bit func[4] controls merge logic 905 to assemble the selected read-modify-write output to the destination register. Thus the result bits only update the selected bit field in the destination register dst1.

Figure 10:
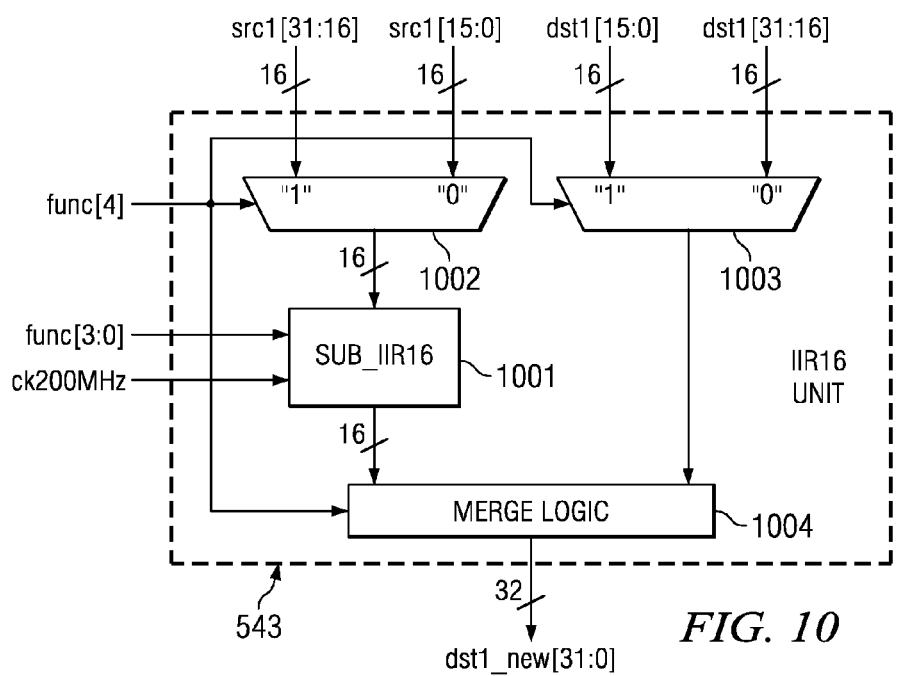
FIG. 10 illustrates the internal construction of IIR16 unit.

FIG. 10 illustrates the internal construction of IIR16 unit 543. IIR16 unit 543 provides processing for a 1-pole, 1-zero LPF/HPF IIR dedicated for 16-bit GGE applications in a single EX stage. This is used for the IIR filters in the ROC compensation algorithm. IIR16 unit 543 contains only one SUB_IIR16 block 1001. SUB_IIR16 block 1001 can be configured to support up to 4 registered feedback terms via control signals func[3:0]. The transfer function that IIR16 unit 543 supports is:

for low pass filter $$H_1(z) = \frac{1 - 2^{-K}z^{-1}}{1 - (1 - 2^{-K})z^{-1}},$$

where $K = (3, 4, 5, 6, 7, 8, 9, 10)$, for high pass filter $$H_2(z) = \frac{(1 - 2^{-K-1})(1 - z^{-1})}{1 - (1 - 2^{-K})z^{-1}}$$

where $K = (3, 4, 5, 6, 7, 8, 9, 10)$

The custom instruction executed on IIR16 reads the LSB or MSB 16 bits as selected by multiplexer 1002 according to fifth control bit func[4] from source register src1, performs one 16-bit IIR computation. Fifth control bit func[4] controls multiplexer 1003 to select the opposite bits from destination register dst1. Fifth control bit func[4] controls merge logic 1004 to merge the 16-bit result from SUB_IRR16 1001 back into the corresponding half-word positions in the destination register. This assembles the selected read-modify-write output to the destination register. Thus the result bits only update the selected bit field in the destination register dst1.

IIR16 unit 543 may be extended to support the vectored 16-bit IIR processing by adding an identical SUB_IIR16 block so that both I and Q data can be processed in one cycle. The low data rate requirement in GGE application makes it more area-efficient to architect the single SUB_IIR16 block in IIR16 unit 543 as illustrated in FIG. 10.

Figure 11:
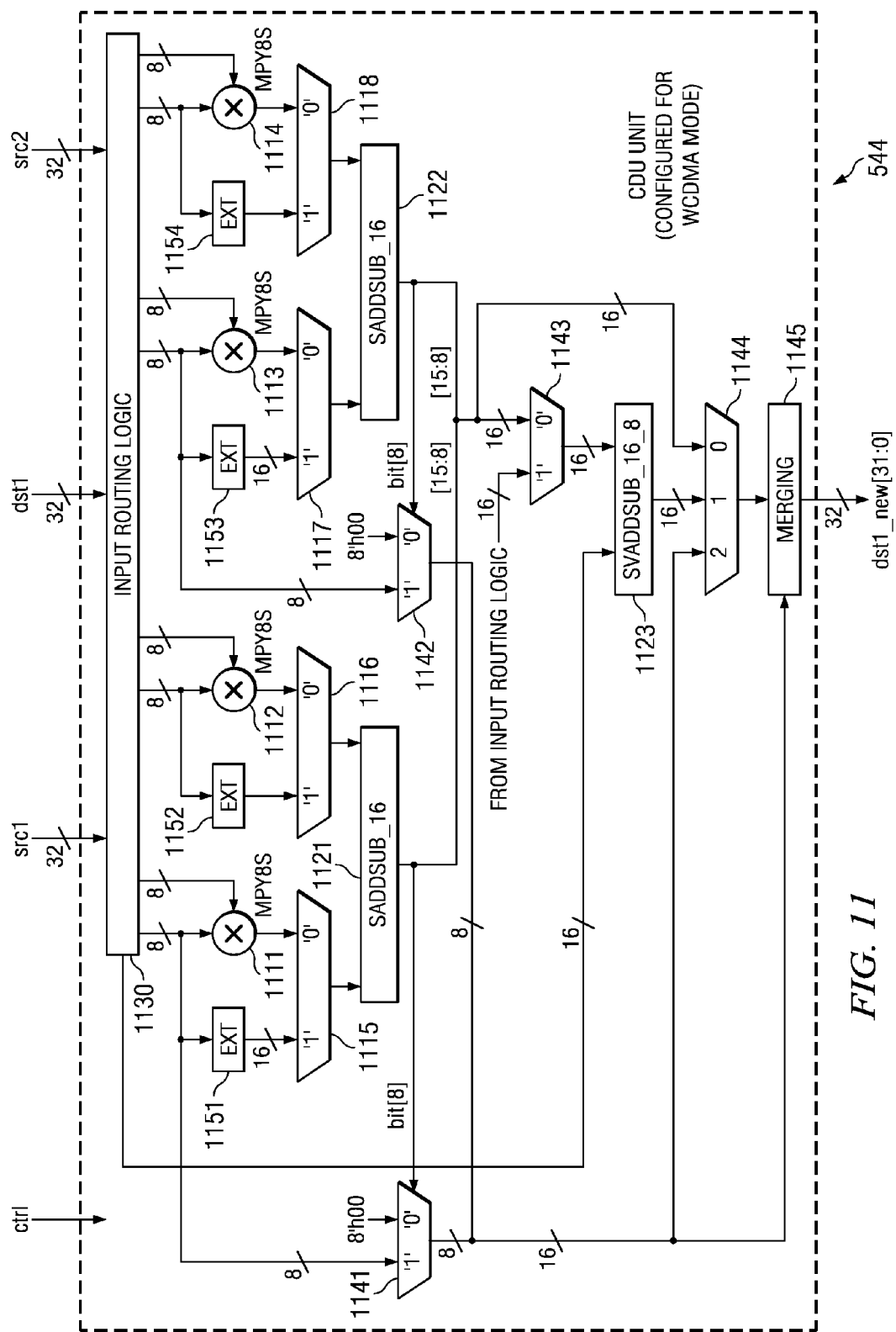
FIG. 11 illustrates the internal construction of CDU.

FIG. 11 illustrates the internal construction of CDU 544 when configured for WCDMA. CDU 544 supports the following computations required for FDRX in GGE/WCDMA:

(1) 8-bit complex computations including addition, subtraction, multiplication and multiply with conjugation;

(2) 16-bit complex addition/subtraction;

(3) 16-bit multiplication;

(4) 8-bit/16-bit vectored comparison;

CDU unit 544 includes the following main blocks: multiplier array 1110 containing 4 identical 8 by 8 multipliers 1111, 1112, 1113 and 1114; 3 16-bit ALUs 1121, 1122 and 1123 configured to 16-bit scalar or 8-bit vector adder/subtractor; input routing logic 1130; and output merging logic 1145. Each multiplier 1111, 1112, 1113 and 1114 can be configured to perform signed or unsigned 8-bit multiplications. CDU 544 supports both 16-bit GGE and 8-bit/16 bit WCDMA computations. The three 32-bit inputs src1, src2 and dst1 are fetched from register file 530. Input routing logic 1130 distributes the data into the inputs of multipliers 1111, 1112, 1113 and 1114 and the inputs of multiplexers 1141, 1142 and 1143 and an input of ALU 1133. ALUs 1121 and 1122 receive an corresponding multiplier output or the input data directly via sign extenders 1151, 1152, 1153 and 114 and corresponding multiplexers 1115, 1116, 1117 and 1118. Multiplexers 1141, 1142, 1143, 1144 and merge logic 1145 select corresponding data an form the 32-bit output to dst1 of register file 530.

CDU 544 may perform an 8-bit complex multiplication including four 8-bit real multiplications and two 16-bit addition/subtraction in a single EX stage. This architecture accelerates those complex multiplications in the WCDMA FDRX path dramatically. When bypassing multipliers 1111, 1112, 1113 and 1114 via multiplexers 1115, 1116, 1117 and 1118, CDU 544 can perform four 8-bit or two 16-bit addition/subtractions in a single EX stage. This feature enables vectored data processing to meet stringent WCDMA performance requirements.

CDU 544 also supports 16-bit multiplication by re-using the 8-bit multiplier array 1110. The rationale for using 8-bit multipliers to perform 16-bit multiplication is as follows. Assume that A and B are two 16-bit signed data, absA and absB are the respective absolute values of A and B. The respective sign bits are A[15] and B[15]. Let absAh=absA[15:8], absAl=absA[7:0], absBh=absB[15:8] and absBl=absB[7:0]. Their multiplication can be expressed by:

$$absA \text{ is either}(\sim A+1) \text{ or } A \text{ dependent upon the state of sign bit } A[15]; \quad (1)$$

$$absB \text{ is either}(\sim B+1) \text{ or } B \text{ dependent upon the state of sign bit } B[15]; \quad (2)$$

$$res\_sign, \text{ the sign of the product } AB, \text{ is } A[15] \, XOR \, B[15]; \quad (3)$$

$$\begin{aligned}
absAB &= [absAh, absAl] * [absBh, absBl] \quad (4)\\
&= (absAh << 8 + absAl) * (absBh << 8 + absBl)\\
&= (absA << 8)(absBh << 8) +\\
&\quad (absAh * absBl + absAl * abdBh) << 8+\\
&\quad absAl * absBl\\
&= (absA * absBh) << 16+\\
&\quad (absAh * absBl + absAl * abdBh) << 8+\\
&\quad absAl * absBl
\end{aligned}$$

$$AB \text{ is either } (\sim absAB + 1) \text{ or } absAB \text{ dependent upon the state of sign bit res\_sign.} \quad (5)$$

Thus a 16-bit multiplication can be partitioned into four parallel 8-bit multiplications with corresponding addition and sign assignment of the four products. This only applies to the absolute value of each multiplicand while three 16-bit additions are required to generate the final 32-bit product. For a negative product, the sign conversion will be applied via an 32-bit add-by-1 logic.

In GGE mode, CDU 544 can perform a single EX state 16-bit real multiplication. CDU 543 requires 4 EX stages to perform a 16-bit complex multiplication. Since GGE has much lower rate requirement compared with WCDMA, 4-cycle complex multiplication is still acceptable.

Figure 12:
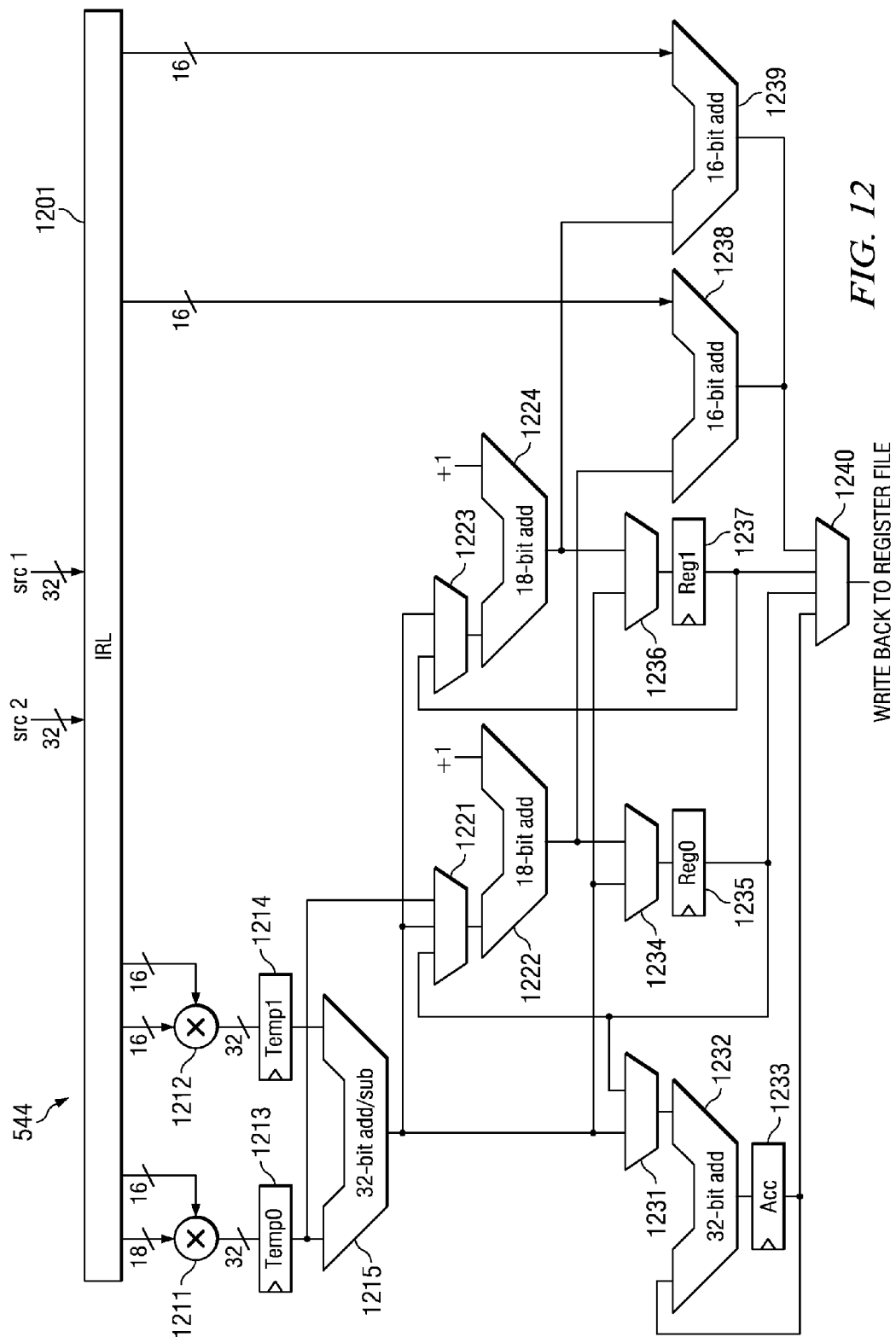
FIG. 12 illustrates an alternative internal construction of the complex data unit.

FIG. 12 illustrates an alternative embodiment of the complex data unit 544. Input routing logic 1201 routes 16-bit data from two registers src1 and src2 in register file 530 to respective inputs of 16 bit by 16 bit multipliers 1211 and 1213. The product result of multiplier 1211 is temporarily stored in register 1212. The product result of multiplier 1213 is temporarily stored in register 1214. ALU 1215 selectively adds or subtracts the products stored in temporary registers 1212 and 1214. Multiplexer 1221 selects either the product stored in temporary register 1212, the output of ALU 1215 or the data stored in register0 1235. ALU 1222 adds 1 to the selected output of multiplexer 1221. Multiplexer 1213 selects either the output of ALU 1215 or the data stored in register1 1237. ALU 1224 adds 1 to the selected output of multiplexer 1223. Multiplexer 1231 selects either the output of ALU 1215 or the data stored in register0 1235. ALU 1232 adds the selected output of multiplexer 1231 to the contents of accumulator register 1233 and stores the result in accumulator register 1233. Multiplexer 1234 selects either the output of ALU 1215 or the output of ALU 1222 for storage in register0 1235. Multiplexer 1236 selects either the output of ALU 1215 or the output of ALU 1224 for storage in register1 1236. ALU 1238 adds the output of ALU 1222 and 16 bits selected by input routing logic 1201. ALU 1239 adds the output of ALU 1224 and 16 bits selected by input routing logic 1201. Merge logic 1240 selects the bits to be output to destination register dst1 in register file 530 from the data stored in accumulator register 1233, the data stored in register0 1235, the data stored in register1 1237, the results of ALUs 1238 and 1239.

Figure 13:
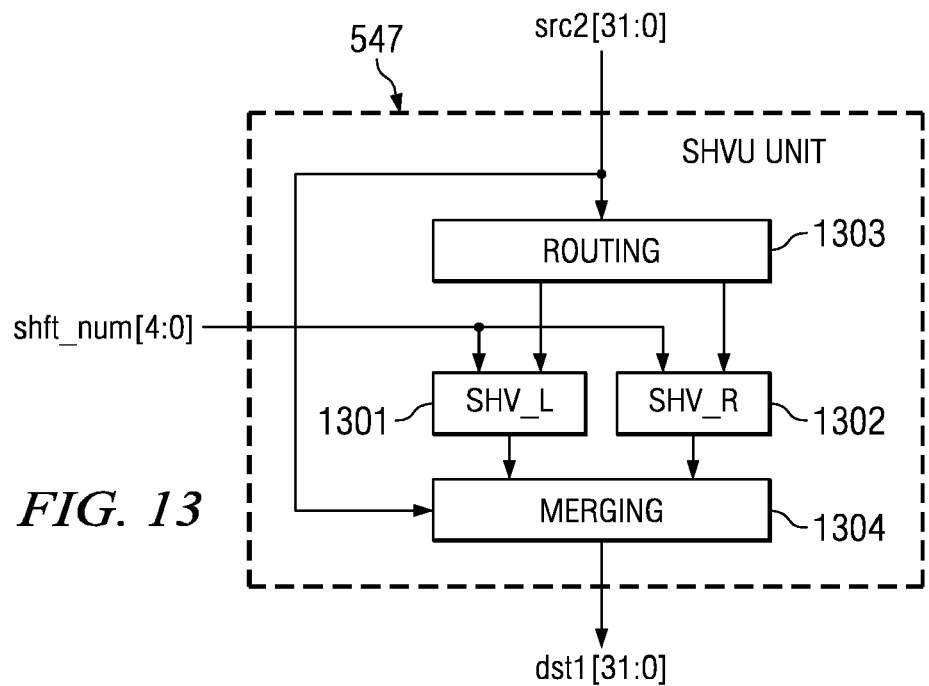
FIG. 13 illustrates the internal construction of SHV unit.

FIG. 13 illustrates the internal construction of SHV unit 547. Different shifting operations are present in the computational load for FDRX data path, and most of them operate on the vector data, where both I and Q components are shifted by the same number of bits. SHV unit 574 provides the vectored shifting capability by integrating two identical barrel shifters 1301 and 1302. SHV unit 574 supports both 8-bit/16-bit vector shifting operations. The direction and magnitude of the shift is controlled by 5-bit input shft_num. If shft_num is positive, the shift is a left shift; otherwise, the shift is a right shift. The magnitude of the shift is the absolute value of shft_num. This saves the additional conditional branch instructions when the shifting numbers can be arbitrarily positive or negative. Input routing logic 1303 supplies instruction specified inputs to the barrel shifters 1301 and 1302 from a source register src1. Merge logic 1304 assembles the results data into an output to destination register dst1.

Figure 14:
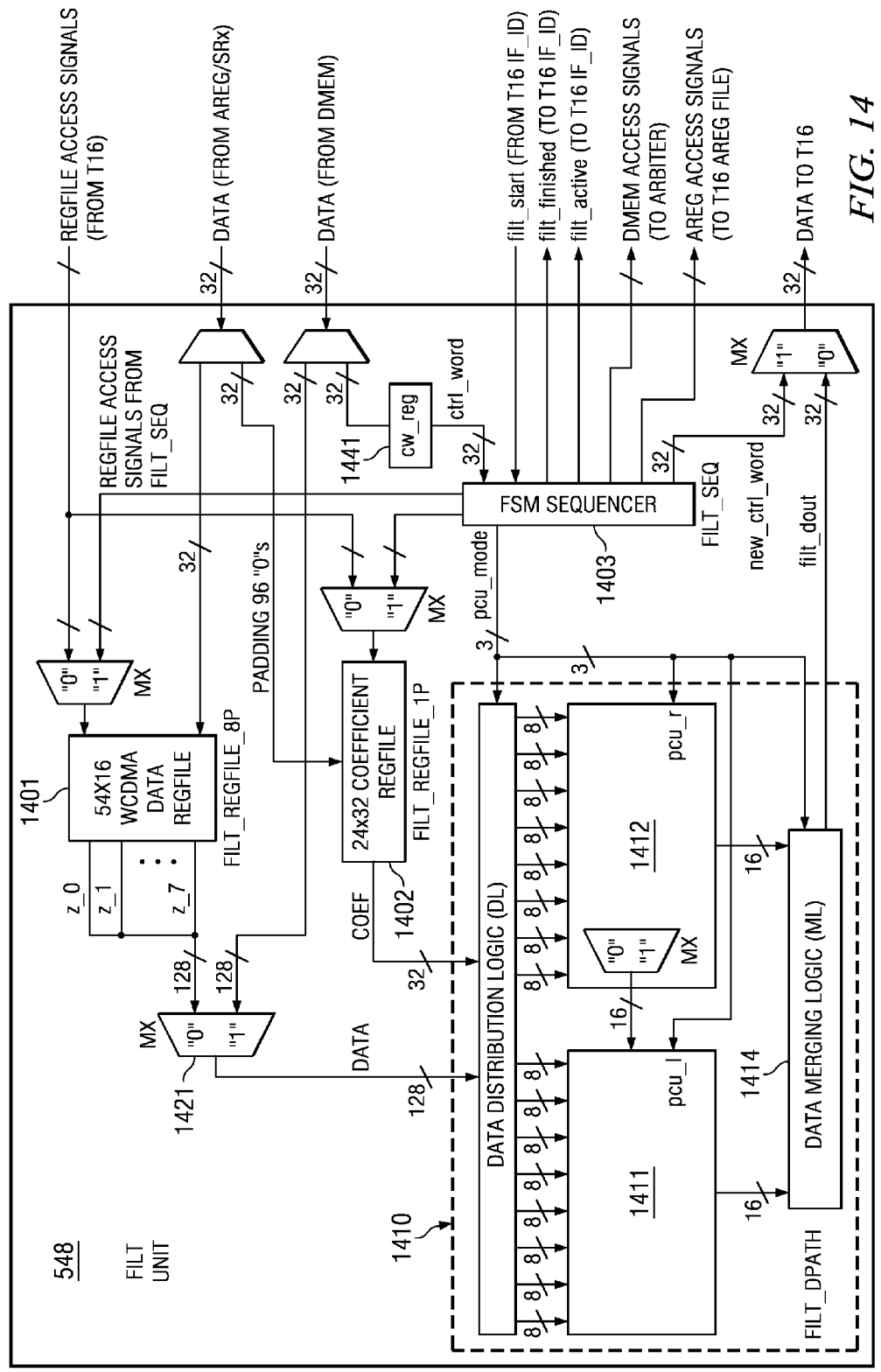
FIG. 14 illustrates the internal construction of FILT unit.

FIG. 14 illustrates the internal construction of FILT unit 548. FILT unit 548 is a multi-cycle functional unit handling the multi-tap finite impulse response (FIR) filtering for both GGE and WCDMA applications. FILT unit 548 includes the following main blocks: 54 by 16 data register file FILT_REGFILE_8P 1401 with 8 read ports; 24 by 32 coefficient register file FILT_REGFILE_1P 1402 with a single read/write port; main data path FILT_DPATH 1410; and local sequencer FILT_SEQ 1403. FILT_DPATH 1410 has two input ports. The 128-bit input 1 is driven by a data read from register file FILT_REGFILE 8P 1401 or external DMEM 520 selected via multiplexer 1421. When data from DMEM 520 is selected it is routed via data distribution logic 1432 and zero padded to 128 bits by adding 96 MSB 0's. The 32-bit input in FILT_DPATH is driven by single-port 24 by 32 register file FILT_REGFILE_1P 1402 which stores FIR coefficients. Both FILT_REGFILE_8P 1401 and FILT_REGFILE_1P 1402 are memory mapped so that they can be accessed by the ASIP's LD/ST instructions. The register file access signals can be generated by FILT's local sequencer 1403 or D-unit 553, which generates the memory read/write signals.

FILT_DPATH 1410 is the core computation unit inside FILT unit 548. FILT_DPATH 1410 performs multiple multiply accumulate (MAC) operations per cycle to accelerate FIRs. FILT_DPATH 1410 includes two identical parallel complex units (PCUs) 1411 and 1412. Each PCU 1411 and 1412 has an architecture similar to CDU 544 with two exceptions:

(1) Each PCU 1411 and 1412 have much simpler control/muxing logic since they only handles FIR; and (2) Each PCU 1411 and 1412 has a 40-bit accumulator to perform a 32-bit MAC. The PCUs 1411 and 1412 each have 3 computation pipeline stages (CP1, CP2 and CP3) to accommodate the 135 to 275 MHz processor frequency. During CP1, the input data are multiplexed, pre-processed and partitioned and four 8-bit multiplications are performed. During CP2, the products are added in two ALUs and some additional logic operations will be performed if necessary. During CP3, the accumulator accumulates the results generated in CP2. The outputs of PCUs 1411 and 1412 are merged into a 32-bit result data merging logic 1414. This merged data is written back to the destination register specified in the FIR custom instruction.

Figure 15:
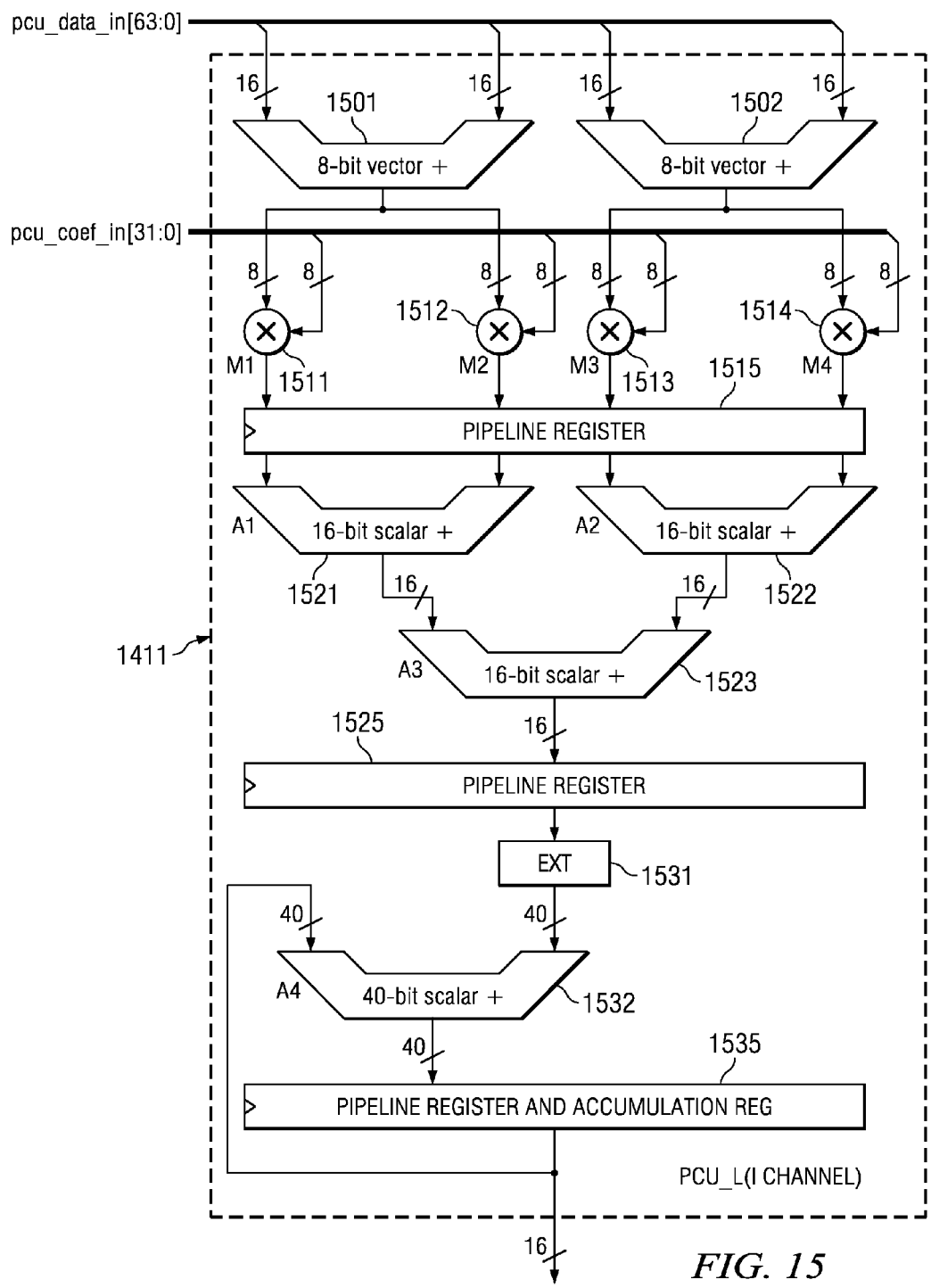
FIG. 15 illustrates the internal construction of a PCU unit.

FIG. 15 illustrates the internal construction of CPUs 1411 and 1412 when configured for real 8 bit FIR. PCU data from multiplexer 1421 supplies the four 16 bit inputs of 8 bit vector adders 1501 and 1502. The output of 8 bit vector adder 1501 supplies to one input of each of multipliers 1511 and 1512. The output of 8 bit vector adder 1502 supplies to one input of each of multipliers 1513 and 1514. The other inputs of multipliers 1511, 1512, 1513 and 1514 are supplied from the PCU coefficient input from coefficient register file FILT_REGFILE_1P 1402. The respective 16 bit products are stored in pipeline register 1515. Pipeline register 1515 serves as the boundary between pipeline stages CP1 and CP2. A pair of 16 bit scalar adders 1521 and 1521 add respective products from multipliers 1511, 1512, 1513 and 1514 via pipeline register 1515. Sixteen-bit scalar adder 1523 adds the sums of 16 bit scalar adders 1521 and 1522. The sum of 16-bit scalar adder 1523 is stored in pipeline register 1525. Pipeline register 1525 serves as the boundary between pipeline stages CP2 and CP3.

Sign extender 1531 sign extends the sum from 16 bit scalar adder 1523 via pipeline register 1525 from 16 bits to 40 bits. This sign extended value supplies one input of 40 bit scalar adder 1532. The other input of 40 bit scalar adder 1532 receives a prior sum accumulated in pipeline register 1535. The sum of 40 bit scalar adder 1532 is stored in pipeline register 1535. Pipeline register 1535 stores the PCU output at the end of pipeline stage CP3. Pipeline register 1535 supplied a 16 bit output to data merging logic 1414.

To reduce the number of issued instructions to perform one multi-tap FIR, FILT_SEQ 1403 automatically generates the address and other necessary read/write signals for the shared DMEM 520 and FILT register files 1401 and 1402 to fetch the delayed samples and coefficients. A dedicated 32-bit control register (CR) 1441 latches the control data for each FIR instruction before FILT_SEQ 1403 starts generating the accessing sequence. This value stored in CR 1441 will be updated and stored back to DMEM 520. This insures that the next iteration of each FIR instruction fetches data from the correct address since the addressing mode for the delayed sample is cyclically increased with the modulo of the FIR tap number. FILT_SEQ 1403 calculates the cyclic accessing address to fetch the delayed sample and the linear address to fetch the coefficient based on the current CR value. The operation of FILT_SEQ 1403 forms another pipeline stage address calculation and load (ACL) for FILT unit 548 which happens before CP1. At the last cycle of each FIR, a writeback (WB) stage stores the result back into the destination register specified in the instruction. FILT unit 546 is a 5-stage pipelined ADU.

FILT operation has variable latency depending on the FIR type and tap number specified in the control word. FILT unit 548 preferably supports the following modes for both 16-bit GGE and 8-bit/16 bit WCDMA: real symmetrical FIR (REAL_FIR_SYM); real asymmetrical FIR (REAL_FIR_ASYM); and complex FIR (COMPLEX_FIR). Given an N-tap FIR for both I and Q channels, the number of cycles to complete operation in FILT unit 548 is:

$$C_{WCDMA,REAL\_FIR\_SYM} = 5 + \left(\frac{N}{8} - 1\right); \quad (1)$$
$$C_{GGE,REAL\_FIR\_SYM} = 5 + (N-1)$$

$$C_{WCDMA,REAL\_FIR\_ASYM} = 5 + \left(\frac{N}{4} - 1\right); \quad (2)$$
$$C_{GGE,REAL\_FIR\_SYM} = 5 + (N-1)$$

$$C_{WCDMA,COMPLEX\_FIR} = 5 + \left(\frac{N}{2} - 1\right); \quad (3)$$
$$C_{GGE,REAL\_FIR\_SYM} = 5 + (2N-1)$$

The coefficients for both GGE and WCDMA are stored in register file FILT_REGFILE_1P 1402 because the register file has much better power and area trade-off than the memory for the same size given 65 nm CMOS manufacturing technology. FILT_REGFILE_8P 1401 has 8 read ports to fetch 8 samples simultaneously so that FILT_DPATH 1410 can perform 8 taps MAC computations in one cycle to meet the sampling rate performance requirements of WCDMA. An 8-tap parallel MAC operation is performed for those symmetrical FIRs which require only 4 multiplications. For the low rate GGE application, it is more area efficient to use DMEM 530 to store the delayed samples for FIR since FILT operation can only complete one tap computation including four 8-bit multiplications for both I and Q channels in one cycle. Using heterogeneous sample storage schemes in FILT unit 548 achieves maximum performance and area trade-off for different applications.

To schedule the operations between FILT unit 548 and other ADU units, FILT unit 548 has a dedicated a control signals filt_start and status signals filt_active and filt_finished interfacing with ASIP 410 decoding logic. FLIT unit 548 starts upon one-cycle pulse on filt_start signal from instruction decode unit 512. FLIT unit 548 asserts a filt_active signal indicating it is currently executing a FIR instruction. Upon the last cycle FILT unit 548 asserts the filt_finished signal. Upon completion FLIT unit 548 de-asserts the filt_active signal. ASIP 410 instruction fetch unit 511 and instruction decode unit 512 employ these status signals to control the issue and execution of the instructions after the FIR instruction. This permits parallel execution where ASIP 410 can execute other instructions when FILT unit 548 is running a multi-cycle FIR, assuming there is no dependency between the FIR instruction and following instructions.

Instruction fetch unit 511 and instruction decode unit 512 are free when a multi-cycle FIR instruction executes on FILT unit 548. Other ADUs in ASIP 410 can utilize these idle cycles to perform other computations not data-dependent to this FIR instruction further reducing the cycle count of the FDRX data path.

Figure 16:
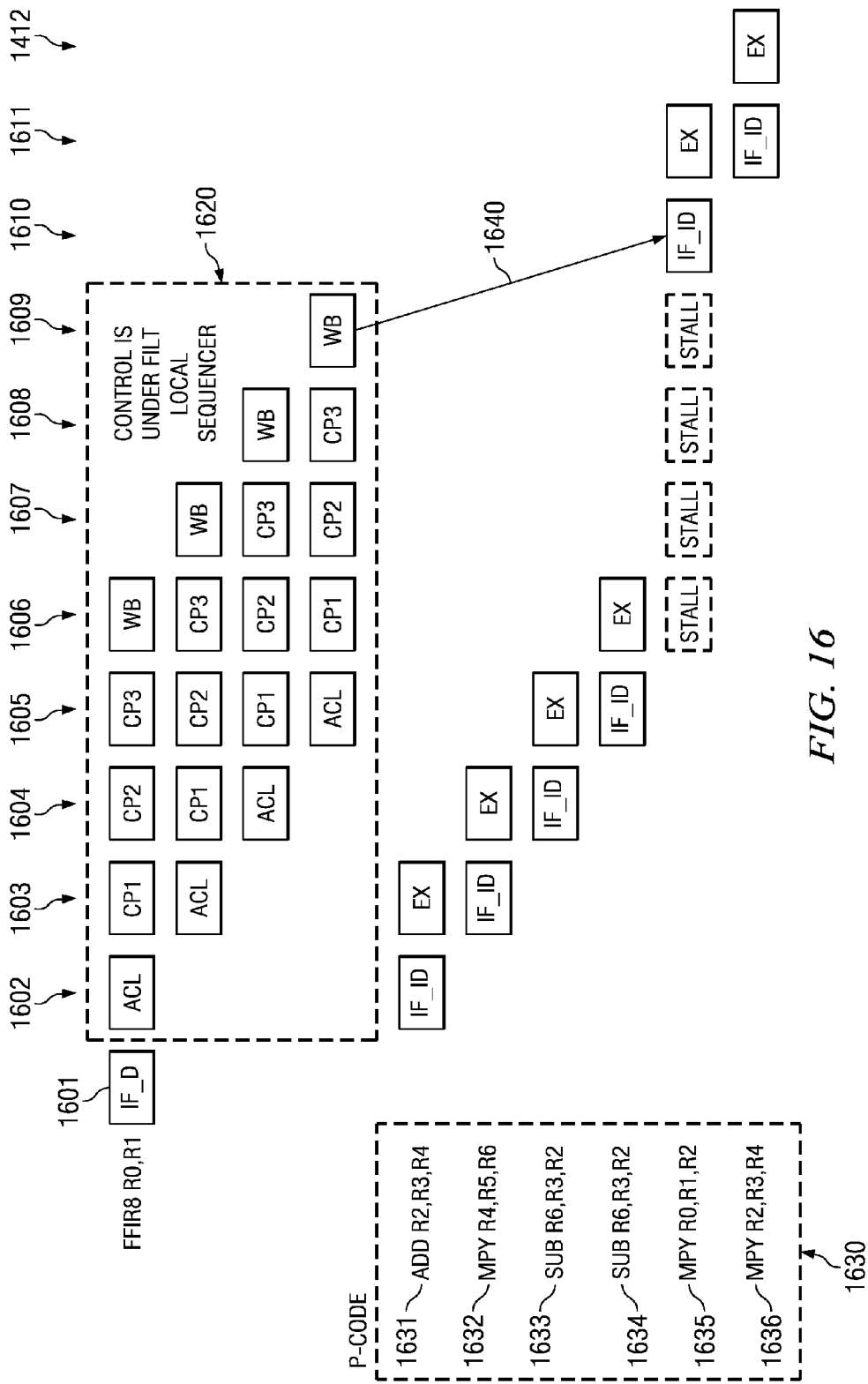
FIG. 16 illustrates a first example of parallel processing on ASIP.
Figure 17:
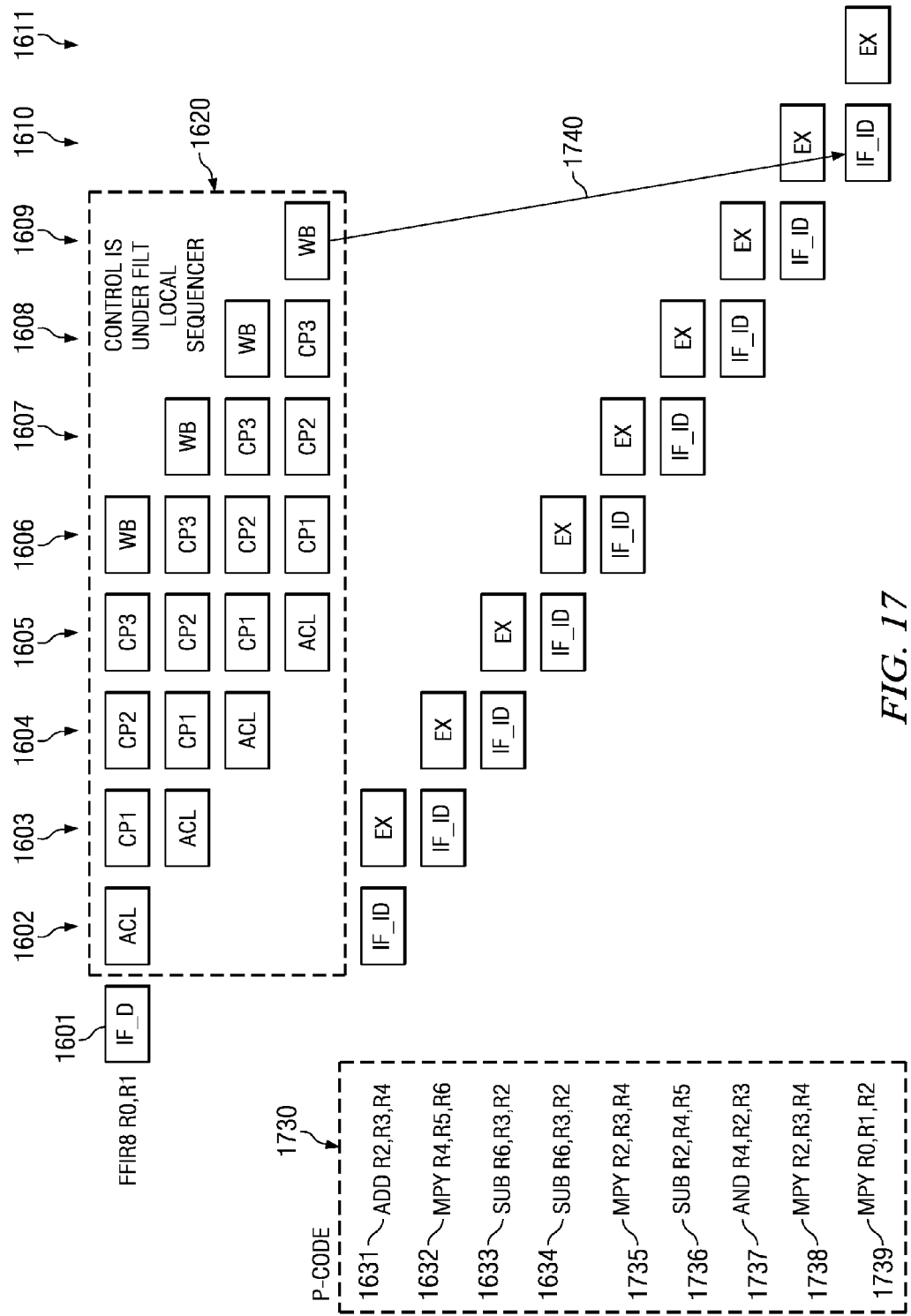
FIG. 17 illustrates a second example of parallel processing on ASIP.

FIGS. 16 and 17 illustrate examples of parallel processing on ASIP 410. At pipeline stage 1601 ASIP 410 decodes a FILT unit 548 instruction FFIR8 R0,R1 employing an instruction fetch and decode (IF_ID) stage. This triggers operation of FILT unit 548. Operations 1620 are under control of the FITL unit 548 logic. FILT unit 548 executes four instructions, each including the previously described pipeline stages of ACL, CP1, CP2, CP3 and WB. These operations require pipeline stages 1602 to 1609. As shown in both FIGS. 16 and 17, FILT unit 548 operation frees instruction fetch unit 511 and instruction decode unit 512. Accordingly, ASIP 410 may execute other instructions such as instructions 1630 illustrated in FIG. 16 and instructions 1730 illustrated in FIG. 17. These instructions are not exactly the same as will be further explained below.

The first of these instructions 1631 is ADD R2,R3,R4. This instruction does not conflict with the executing FILT instruction. Therefore this instruction can execute with its IF_ID stage occurring pipeline stage 1602 and its EC stage occurring at pipeline stage 1603. The next instruction 1632 is MPY R4,R5,R6 and also has no conflict and executes with its IF_ID stage occurring pipeline stage 1603 and its EC stage occurring at pipeline stage 1604. Likewise instruction 1633 (SUB R6,R3,R2) has no conflict and executes with its IF_ID stage occurring pipeline stage 1604 and its EC stage occurring at pipeline stage 1605. Instruction 1634 (SUB R6,R3,R2) has no conflict and executes with its IF_ID stage occurring pipeline stage 1605 and its EC stage occurring at pipeline stage 1606.

In FIG. 16 instruction 1635 is MPY R0,R1,R2. This instruction has a source register R1 which is the destination register of the FFIR8 instruction running on FILT unit 548. Though this instruction could use instruction fetch unit 511 and instruction decode unit 512, this is a data conflict. Instruction 1635 requires the results of the FILT instruction. Accordingly, instruction 1635 stalls during pipeline stages 1606 to 1609. The FILT instruction completes its last write back during pipeline stage 1609 insuring that the correct data is stored in register R1. Instruction 1635 is permitted to execute with its IF_ID stage occurring pipeline stage 1610 and its EC stage occurring pipeline stage 1611. Likewise instruction 1636 (MPY R2,R3,R4) executes with its IF_ID stage occurring pipeline stage 1611 and its EC stage occurring at pipeline stage 1612.

In FIG. 17 instructions 1735 (MPY R2,R3,R4), 1736 (SUB R2,R4,R5), 1737 (ADD R4,R2,R3) and 1738 (MPY R2,R3,R4) have no data conflict with the FILT instruction and execute in parallel. Instruction 1739 (MPY R0,R1,R2) employs a source register R1 which is the destination register of the FILT instruction. However, the FILT instruction has completed and thus data register R1 stores the correct data. Instruction 1739 executes normally with its IF_ID stage occurring pipeline stage 1610 and its EC stage occurring at pipeline stage 1611.

As shown in FIGS. 16 and 17, once ASIP 410 hands over the execution of an FIR instruction to FILT unit 548, it continues issuing/decoding and executing the instructions after that FIR instruction. If any following instruction has access to the destination register of the FIR instruction, it will be stalled if its IF_ID stage is overlapped with the execution of the current FIR instruction. If programmers schedule the code that does not read/write the FIR's destination register after this FIR instruction, code will execute in parallel with the FIR. This parallel execution will end in two following two cases: (1) other code has an instruction reading/writing FIR's destination register; or (2) the FIR ends before the other code starts issuing the instruction accessing its destination register. The later case has better cycle utilization due to the less stalled cycles. Thus it is advantageous to partition and schedule the application code carefully to get the optimized performance.

Below is a list of the 37 custom instructions of the preferred embodiment of this invention. The description of each instruction includes the host ADU which operates in the EX stage. Most instructions take one or two source registers for input data and one destination register to write back the result. Almost all instructions have one cycle's throughput. The FFIR8 and FFIR16 instruction's throughput depends on the FIR type and size. For the IIR instructions, an implicit WB stage will be engaged to perform the internal register update by current EX stage's computation result.

FILT Unit 548 Instructions

FLDCR #addr7 This instruction loads a control word from memory at address #addr7 to FILT. This executes in one cycle.

FSTCR #addr7 This instruction stores the control word in FILT to memory at address #addr7. This executes in one cycle.

FMV16_CR src2: This instruction moves data from register src2 of register file 530 to FILT 548 or DMEM 520. This executes in one cycle.

FMV16_CR_1 src2: This instruction moves data from register src2 of register file 530 to FILT 548 or DMEM 520 and increments the destination address. This executes in one cycle.

FFIR8 dst1,dst2 This instructions performs a FIR on four 8-bit WCDMA samples and stores the results into registers dst1 and dst2. This executes in 4+N/x cycles where x is 8, 4 or 2.

FFIR16 dst1 This instruction performs a FIR on one 16-bit GGE sample storing the result in register dst1. This executes in 4+Nx cycles where x is 1 or 2.

IIR8 Unit 542 Instructions

IIR8HL cnfg,src1,dst1 This instruction performs parallel 8-bit IIR for WCDMA taking the 16 MSB from register src1 and stores the results in the 16 LSB of register dst1. This executes in one cycle.

IIR8LL cnfg,src1,dst1 This instruction performs a parallel 8-bit IIR for WCDMA taking the 16 LSB from register src1 and stores the results in the 16 LSB of register dst1. This executes in one cycle.

IIR8HH cnfg,src1,dst1 This instruction performs a parallel 8-bit IIR for WCDMA taking the 16 MSB from register src1 and stores the results in the 16 MSB of register dst1. This executes in one cycle.

IIR16 Unit 543 Instructions

IIR16 cnfg,src1,dst1 This instruction performs a 16-bit LPF IIR for GGE using the 16 LSB of register src1 and stores the result 16 LSB in register dst1. This executes in one cycle.

IIR16H cnfg,src1,dst1 This instruction performs a 16-bit LPF IIR for GGE using the 16 MSB of register src1 and stores the result 16 LSB in register dst1. This executes in one cycle.

CDU 542 Instructions

CADDV8LHH src1,src2,dst1 This instruction performs an 8-bit vectored addition and updates the 16 MSB of register dst1. This executes in one cycle.

CADDV8LLL src1,src2,dst1 This instruction performs an 8-bit vectored addition and updates the 16 LSB of register dst1. This executes in one cycle.

CDSUBV8 src1,src2,dst1 This instruction performs an 8-bit double vectored subtraction. This executes in one cycle.

CADDV16 src1,src2,dst1 This instruction performs a 16-bit vectored addition. This executes in one cycle.

CSUBV16 src1,src2,dst1 This instruction performs a 16-bit vectored subtraction. This executes in one cycle.

CSUBJM8LHL src1,src2,dst1 This instruction performs a conjugate, multiply and subtraction, and updates the 16 LSB of register dst1. This executes in one cycle.

CSUBJM8HHH src1,src2,dst1 This instruction performs a conjugate, multiply and subtraction, and updates the 16 MSB of register dst1. This executes in one cycle.

CMPYX8LL src1,dst1 This instruction performs a special multiply for IQMC AE and updates the 16 LSB of register dst1. This executes in one cycle.

CMPYX8LL src1,dst1 This instruction performs a special multiply for IQMC AE and updates the 16 MSB of register dst1. This executes in one cycle.

CPMV8HHH src1,src2,dst1 This instruction performs a 8-bit vectored compare and move, and updates the 16 MSB of register dst1. This executes in one cycle.

CPMV16 src1,src2,dst1 This instruction performs a 16-bit vectored compare and move. This executes in one cycle.

MPY src1,src2,dst1 This instruction performs a 16-bit signed multiplication and updates the 16 LSB of register dst1. This executes in one cycle.

MPYH src1,src2,dst1 This instruction performs a 16-bit signed multiplication and updates the 16 MSB of register dst1. This executes in one cycle.

MPYLH src1,src2,dst1 This instruction performs a 16-bit signed multiplication. This executes in one cycle.

SHVU 547 Instructions

SHRV8 src1, src2, dst1 This instruction performs a vectored 8-bit right shifting and updates the 16 LSB of register dst1. This executes in one cycle.

SHRV8 src1, #ucst3, dst1 This instruction performs a vectored 8-bit right shifting by constant and updates the 16 LSB of register dst1. This executes in one cycle.

SHRV8H src1,src2,dst1 This instruction performs a vectored 8-bit right shifting and updates the 16 MSB of register dst1. This executes in one cycle.

SHRV8H src1,#ucst3,dst1 This instruction performs a vectored 8-bit right shifting by constant and updates the 16 MSB of register dst1. This executes in one cycle.

SHRV16 src1, src2, dst1 This instruction performs a vectored 16-bit right shift. This executes in one cycle.

SHRV16 src1, #ucst4, dst1 This instruction performs a vectored 16-bit right shifting by 4-bit constant. This executes in one cycle.

SHRLV8LHL src1,src2,dst1 This instruction performs a vectored 8-bit left/right shifting and updates the 16 LSB of register dst1. This executes in one cycle.

SHRLV16 src1,src2,dst1 This instruction performs a vectored 16-bit left/right shifting. This executes in one cycle.

SAM Unit 541 Instruction

FLD1S16: This instruction loads 1 sample from SAM unit 541 to FILT 548 or DMEM 520. This executes in one cycle.

WFE This instruction waits for an event input. This instruction executes in one more cycle than the length of time until the event.

APE Unit 545 Instructions

APE8 src1, dst1 This instruction performs an 8-bit priority encoding and stores the result in the 16 LSB of register dst1. This executes in one cycle.

APE8H src1,dst1 This instruction performs as 8-bit priority encoding and stores the result in the 16 MSB of register dst1. This executes in one cycle.

APE16 src1,dst1 This instruction performs a 16-bit priority encoding. This executes in one cycle.

Figure 18:
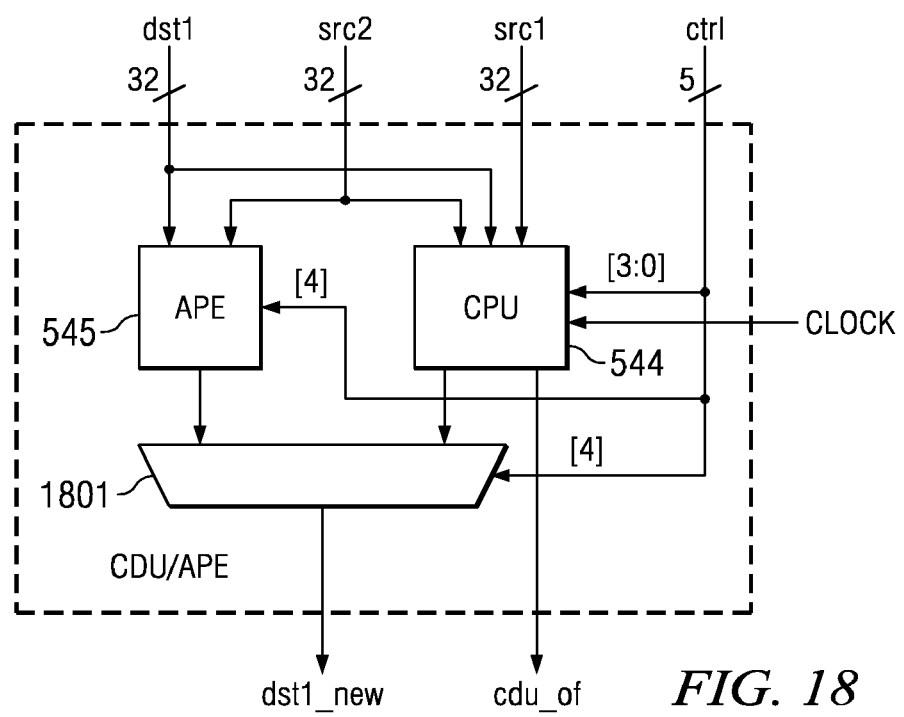
FIG. 18 illustrates and example of a combined special purpose functional unit.

FIG. 5 illustrates only one embodiment of this invention. It is feasible to provide differing mixes of ADUs selected for the particular application of the completed integrated circuit. FIG. 18 illustrates a combined APE unit 545 and CDU 544. In the combined unit APE 545 receives data from src2 data register and des1 data register within register file 530. APE unit 545 operates as previously described based upon a fifth bit ctrl[4] of a control signal. The output of APE unit 545 is supplied to one input of multiplexer 1801. CDU 544 receives as input data from src1 data register, src2 data register and des1 data register within register file 530. CDU 544 operates as previously described under control of four control bit ctrl [3:0]. The output of CDU 544 is supplied to the second input of multiplexer 1801. Multiplexer 1801 selects for output one of its inputs based upon bit ctrl[4]. This output is saved in register dst1 in register file 530. CDU 544 also produces an overflow signal cdu_of.

Figure 19:
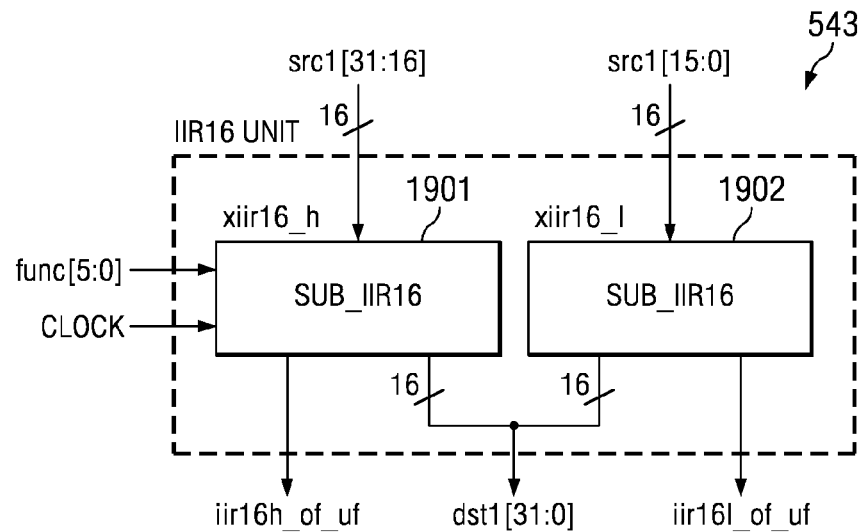
FIG. 19 illustrates an alternative internal construction of an IIR16 unit.

FIG. 19 illustrates an alternative embodiment of IIR16 unit 543. In contrast to IIR16 unit 543 illustrated in FIG. 10, this alternative embodiment includes SUB_IIR16 blocks 1901 and 1902. Each of these blocks 1901 and 1902 could be constructed as described in conjunction with FIG. 10. SUB_IIR16 1901 receives the most significant bits (src1[31:16]) of data recalled from data register scr1 of register file 530. SUB_IIR16 1901 receives the least significant bits (src1[15:0]) of data recalled from data register scr1 of register file 530. The respective 16-bit outputs are concatenated to produce 32 bits for storage in the data register dst1 of register file 530. Each of SUB_IIR16 blocks 1901 and 1902 are controlled by a six bit function signal func[5:0]. Note further, each of SUB_IIR16 blocks 1901 and 1902 produces a combined overflow and underflow signal.

Figure 20:
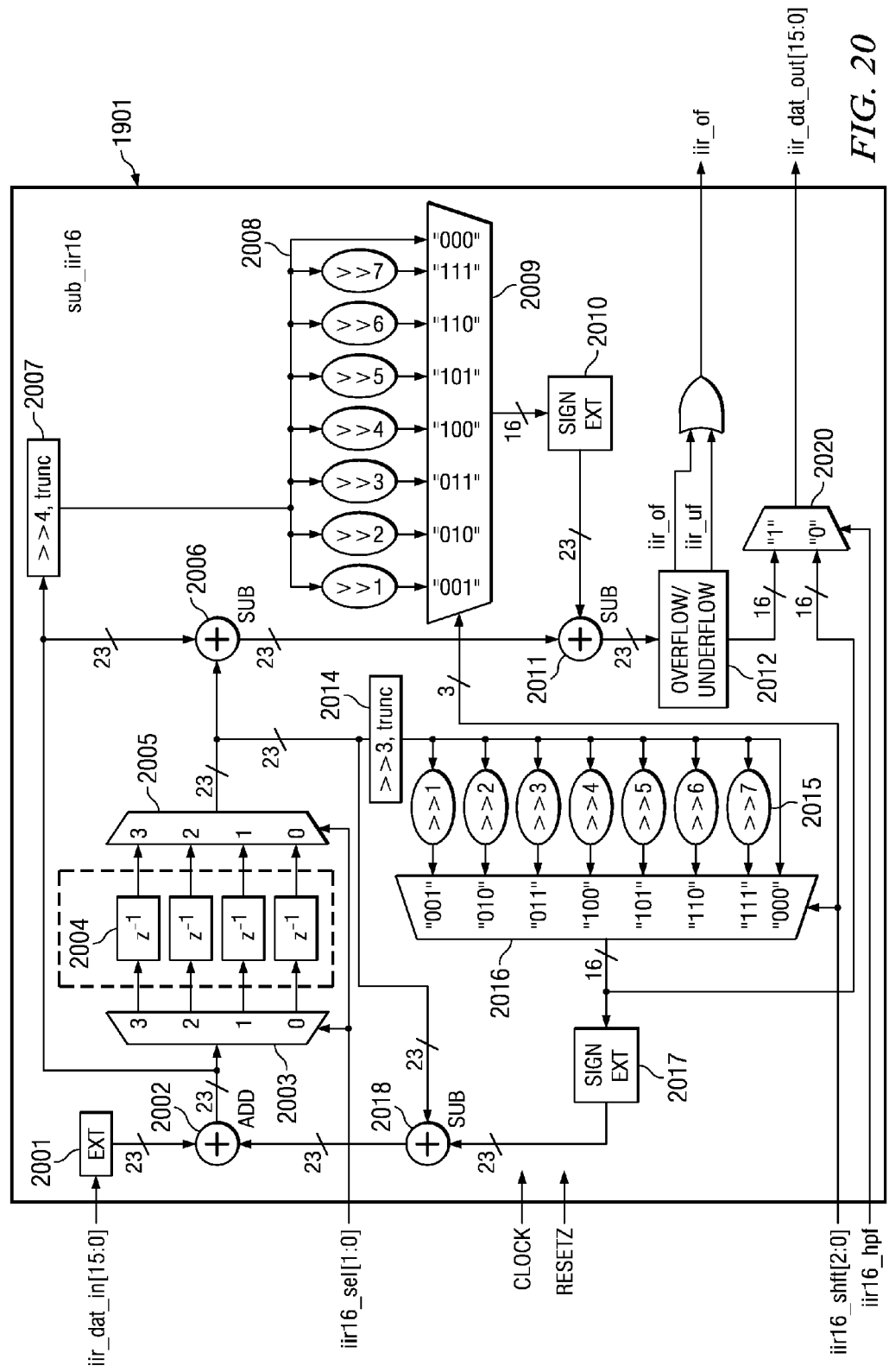
FIG. 20 illustrates the internal construction of a IIR operation component.

FIG. 20 illustrates the internal construction of SUB_IIR16 blocks 1901 and 1902. Note that SUB_IIR_HB block 901, SUB_IIR LB block 902 and SUB_IIR16 block 1001 could be similarly constructed. IIR16 performs the single-cycle 1-pole, 1-zero LPF/HPF IIR for both GGE and WCDMA applications. It can be used for the low-pass filters in the ROC compensation algorithm, or high-pass filters between the RCF2 and IQMC/CSF. IIR16 unit contains two identical SUB_IIR16 blocks. The 16 bits of input data is zero extended to 23 bits in zero extend block 2001. This is added to a 23-bit feedback term in adder 2002. The sum of adder 2002 is applied to the input of demultiplexer 2003. Demultiplexer 2003 steers its input to one of four 23-bit feedback registers 2004 dependent upon the control signal irr16_sel[1:0]. Multiplexer 2005 selects the data from one of the four 23-bit feedback register 2004. This output is applied to a subtraction input of adder 2006. The other input of adder 2006 comes directly from the output of adder 2002. The output of adder 2002 is also supplied to truncating shifter 2007, which executes a four place right shift and discards the least significant bits. The output of truncating shifter 2007 supplies a bank of shifters 2008. This bank of shifters 2008 executes right shifts of 0 to 7 places. Multiplexer 2009 selects one of the shifted outputs from bank of shifters 2008 dependent upon the control signal iir16_shft[2:0]. A 16-bit output of multiplexer 2009 is sign extended to 23 bits by sign extender 2010. This output supplies a subtraction input of adder 2011. The other input of adder 2011 comes from the sum output of adder 2006. The sum output of adder 2011 supplies overflow/underflow block 2012. Overflow/underflow block 2012 generates separate overflow and underflow signals. AND gate 2013 generates the combined overflow/underflow output of SUB_IIR16 block 1901. A data output form overflow/underflow block 2012 supplies one input to multiplexer 2020.

The output of multiplexer 2005 also supplies the input of truncating shifter 2014, which executes a three place right shift and discards the least significant bits. The output of truncating shifter 2014 supplies a bank of shifters 2015. This bank of shifters 2015 executes right shifts of 0 to 7 places. Multiplexer 2016 selects one of the shifted outputs from bank of shifters 2015 dependent upon the control signal iir16_shft[2:0]. A 16-bit output of multiplexer 2016 is sign extended to 23 bits by sign extender 2017. The sign extended 23-bit output of truncating shifter 2017 supplies the subtraction input of adder 2018. The other input of adder 2018 comes from multiplexer 2005. The sum output of adder 2018 supplies a second input to adder 2002.

The 16-bit output of multiplexer 2016 supplies a second input to multiplexer 2020. Multiplexer 2020 selects its first input or its second input dependent upon the low pass/high pass signal iir16_hpf. The output of multiplexer 2020 is the output of SUB_IIR16 1901.

The transfer functions that IIR16 supports in GGE and WCDMA modes are:

for low pass filter $$H_1(z) = \frac{1 - 2^{-K}z^{-1}}{1 - (1 - 2^{-K})z^{-1}},$$

where $K = (3, 4, 5, 6, 7, 8, 9, 10)$, for high pass filter $$H_2(z) = \frac{(1 - 2^{-K-1})(1 - z^{-1})}{1 - (1 - 2^{-K})z^{-1}}$$

where $K = (3, 4, 5, 6, 7, 8, 9, 10)$.

Figure 21:
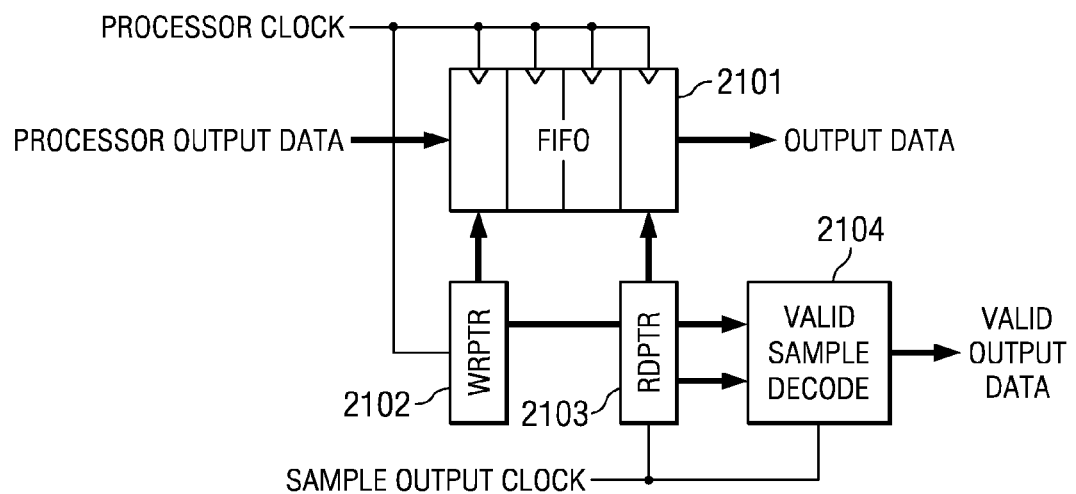
FIG. 21 illustrates the internal construction of an output buffer unit.

FIG. 21 illustrates the internal construction of output unit 2100. Output unit 2100 receives the data sample from register file 530, provides appropriate buffering and outputs data synchronized to the external clock Output unit 2100 operates at two clock domains: sample clock cksam; and a processor clock. Input data is stored in first-in-first-out (FIFO) buffer 2101 in synchronism with the processor clock. Write pointer register 2102 directs the storage address in FIFO buffer 2101. Write pointer register 2102 increases by 1 on each rising edge of the processor clock in a circular fashion. Read pointer register 2103 increases by 1 on each rising edge of the external clock when a custom store instruction is successfully decoded and executed. FIFO buffer 2101 is read from a read address provided by read pointer register 2103 to generate the data output of output unit 2100. Valid sample decode logic 2104 compares read pointer register 2102 and write pointer register 2103. Valid sample decode logic 2104 causes FIFO buffer 2101 to generate output data by reading FIFO buffer 2101 from the location indicated by read pointer register 2103. This read data is synchronized to the external clock. This output data may be read by an external system when valid.

Compared with the available ASIC solution with limited configurability, the ASIP is capable of supporting the FDRX for multiple wireless applications. Upgrading the software can enable a protocol change without any hardware change. This feature is essential for the future low-cost 3G platforms targeting the emerging markets.

WCDMA FDRX consists of the following 7 blocks in the worst case: RES 101; HPF 104; IQMC_CE 105; CSF 108; DCF 109; IQMC_AE 201; and ROC 202. Among them RES, CSF and DCF are multi-tap FIRs which may be performed on FILT unit 548. According to a performance estimation of FILT unit 548, filling the FILT pipeline takes at least 50% of the total cycle count on a 32-tap symmetrical CSF. Each FFIR8 instruction listed above is customized to perform FIR on 4 successive samples to efficiently utilize the FILT pipeline. Through this group sample processing method, the overhead of filling FILT pipeline reduces to 20% on the same 32-tap CSF. This group processing requires an increased size of FILT_REGFILE_8P 1401 to accommodate the additional 3 samples for each FIR block.

Listing 1 shows the proposed FDRX pseudo code for WCDMA. To schedule parallel executable code following each FFIR8 instruction, the ROC algorithm is partitioned into two blocks: ROC_1 performs low-pass IIR, DC value accumulation and averaging for the first 64 samples in an RX slot; and ROC_2 reads the sample pushed into a 64-entry FIFO during ROC_1 and subtracts the average DC estimated in ROC_1 from each sample after the sixth fourth sample. The FIFO is memory mapped onto the ASIP address space and its write/read is implemented by ST/LD instructions. Since the input of ROC is the output of the last FIR (DCF) in FDRX path, ROC algorithm on the previous sample is executed in parallel with the RES and DCF on the current sample via the instruction-level parallelism. IQMC_AE is scheduled to be parallel executable code with CSF on the current sample since its input is the output of IQMC_CE, which precedes CSF.

Listing 1

```
fdrx_wcdma( )
{
intialize_HWA1( )
WO_curr=WO_new; sample_count=0
wait_for_event( );
ld_sample_FILT(s0,s1,s3,s3);
{x0,x1,x2,x3}=res_fir(s0,s1,s3,s3);
if(sample_count > 64){
    ROC_2(s0_prev,s1_prev,s2_prev,s3_prev);
    write_results_to_BB( );}
{x4,x5,x6,x7}=hpf(x0,x1,x2,x30;
{x8,x9,x10,x11}== iqmc_ce(x4,x5,x6,x7);
{x12,x13,x14,x15}=csf_fir(x8,x9,x10,x11);
```

-continued

Listing 1

```
if(sample_count < 64){
    iqme_ae)x8,x9,x10,x11);
    upadte_W0_new( );}
{y0,y1,y2,y3}=dcf_fir(x12,x13,x14,x15)'
if(sample count < 64){
    ROC_1(s0_prev,s1_prev,s2_prev,s3_prev);
    {s0_prev,s1_prev,s2_prev,s3_prev}={y0,y1,y2,y3};
}
```

Based on the scheduling of the assembly code about 74 cycles are required to finish the 4 incoming samples FDRX processing task. This translates to a sampling rate of 10.81 Msps. This meets the WCDMA performance requirement of 7.84 Msps with 37.8% margin.

GGE FDRX is more complicated since it needs ZIF to convert the signal from IF to baseband and the second ZIF 107 along with other complex-domain computation blocks for ROC cancellation. The whole FDRX has three multi-cycle FIRs including: RES 101 of 12 cycles; CSF 108 of 68 cycles; and DCF 109 of 20 cycles. Listing 2 shows the pseudo code of the GGE FDRX. Both IQMC_AE 301 and ROC 302 algorithms are scheduled in parallel with CSF 108 since the cycle number of CSF 108 exceeds the cycle requirement of IQMC_AE 301 and ROC 302. Similar to the FDRX software architecture in WCDMA mode, the ROC 302 of the previous sample is overlapped with current sample CSF 108 in GGE.

Listing 2

```
Fdrx_gge( )
{
    initialize_HWA1( )
    W0_curr=W0_new; sample_count=0
    initialize_HWA2( )
    wait_for_event( );
    ld_sample_FILT(s0);
    x0=res_fir(s0)
    hpf_1( );
    hpf_2(x0);
    x1=iqmc_ce(x0);
    x2=zif(x1);
    x2=csf_fir(x2);
    if(sample_count > 64){
        iqmc_ae(x1);
        update_W0_new( );}
    if(sample_count < 64){
        ROC_1(s0_prev)
        else{
            ROC_2(s0_prev);
            write_results_to_BB( );}
    x4=dcf_fir(x3);
    s0_prev=x4;
}
```

Based on scheduling of the assembly code, about 150 cycles are needed to finish one incoming sample FDRX processing task. This translates to a sampling rate of 1.33 Msps. This sampling rate meets the GGE performance requirement of 1.083 Msps with 22.8% margin.

This invention is an application specific instruction processor to implement the complete fixed-rate DRX signal processing paths (FDRX) to provide a reconfigurable processor-based solution for the multi-mode 3G wireless applications with stringent performance requirements. This architecture is based on the baseline 16-bit RISC architecture with addition functional blocks (ADU) tightly coupled with the based processor's data path. Each ADU accelerates one or more computation-intensive tasks in FDRX signal path, such as multi-tap FIRs, IIRs, complex domain and vectored data processing. The ADUs are controlled through custom instructions based on the load/store architecture. The whole FDRX data path can be easily implemented by the software employing these custom instructions. The proposed ASIP architecture shares the same set of hardware resources to support both 16-bit GGE mode and 8-bit/16 bit WCDMA mode. A multiplier array can be configured into an 8-bit mode to perform 8 FIR taps/cycle in maximum to meet the tight WCDMA data rate requirement and configured into a 16-bit mode to perform 1 FIR tap/cycle to meet the GGE data rate requirement.

This invention includes a multi-cycle FILT unit with a local sequencer, which fetches the data and coefficients for FIR instruction and frees the main processor's fetch and decode logics. The code following a FIR instruction issue and execute in parallel if there is no data dependency. This parallelism enables us to schedule some code to run in parallel with the FIR instruction so that the complete FDRX data path can be put into this ASIP architecture without additional cycles. Early performance estimation for the worst-case sampling rate in WCDMA of 10.83 Msps and in GGE of 1.33 Msps. These meet the corresponding data rate requirements with greater than 20% performance margins.

What is claimed is:

1. An application specific instruction processor comprising:
    a fetch unit for fetching instructions from a memory;
    an instruction decoder connected to said fetch unit for decoding instructions fetched by said fetch unit;
    a data register file including a plurality of data registers;
    a load/store unit connected to said instruction decoder, said data register file and an external memory, said load/store unit operable
        in response to a decoded load instruction to transfer data from an instruction specified address in external memory to an instruction specified one of said plurality of data registers, and
        in response to a decoded store instruction to transfer data from an instruction specified one of said data register to an instruction specified address in external memory;
    at least one general purpose functional unit connected to said instruction decoder and said data register file, said at least one general purpose functional unit operable in response to at least one instruction to recall data from at least one instruction specified data register, perform an instruction specified data processing operation and store results in an instruction specified one of said data registers;
    at least one special purpose functional unit connected to said instruction decoder and said data register file, said at least one special purpose functional unit operable in response to at least one instruction to recall data from at least one instruction specified data register, perform an instruction specified special purpose data processing and store results in an instruction specified one of said data registers;
    said fetch unit, said instruction decoder, said data register file, said load/store unit and said at least one general purpose functional unit operate in synchronism with a processor clock signal; and
    said at least one special purpose functional unit includes a sample unit receiving data in synchronism with a external clock signal and said external clock signal, said sample unit including a write pointer receiving external clock signal and storing a write location, said write pointer incrementing in synchronism with said external clock signal, a read pointer receiving said processor clock signal and storing a read location, said read pointer incrementing in synchronism with said processor clock signal upon a processor read request, a FIFO data register file having a plurality of data registers operating in synchronism with said processor clock signal, receiving data input in synchronism with said external clock signal, said write pointer and said read pointer, said input data register storing received data in a data register corresponding to said write pointer and outputting data from a data register corresponding to said read pointer upon a processor read request.

2. The application specific instruction processor of claim 1, wherein:

said sample unit further includes a valid sample decode unit receiving said write pointer and said read pointer and generating a valid read data signal when valid data is stored in said FIFO data register file at said location indicated by said read pointer.

3. The application specific instruction processor of claim 2, wherein:

said sample unit further wherein said write pointer and read pointer operate in a first mode and a second mode, wherein in said first mode said write pointer and said read pointer increment circularly to each data register in said FIFO data register file, and in said second mode said write pointer and said read pointer increment circularly to less than all data registers in said FIFO data register file.

4. An application specific instruction processor comprising:

a fetch unit for fetching instructions from a memory;

an instruction decoder connected to said fetch unit for decoding instructions fetched by said fetch unit;

a data register file including a plurality of data registers;

a load/store unit connected to said instruction decoder, said data register file and an external memory, said load/store unit operable in response to a decoded load instruction to transfer data from an instruction specified address in external memory to an instruction specified one of said plurality of data registers, and in response to a decoded store instruction to transfer data from an instruction specified one of said data register to an instruction specified address in external memory;

at least one general purpose functional unit connected to said instruction decoder and said data register file, said at least one general purpose functional unit operable in response to at least one instruction to recall data from at least one instruction specified data register, perform an instruction specified data processing operation and store results in an instruction specified one of said data registers;

at least one special purpose functional unit connected to said instruction decoder and said data register file, said at least one special purpose functional unit operable in response to at least one instruction to recall data from at least one instruction specified data register, perform an instruction specified special purpose data processing and store results in an instruction specified one of said data registers, wherein said at least one special purpose functional unit includes a priority encoding unit including a cross bar receiving data from an instruction specified one of said data registers and an output selecting an instruction specified subset of bits of said data, an inverter having an receiving said instruction specified subset of bits of said data and an output generating a bit wise inversion of said input, a multiplexer having a first input connected to said output of said cross bar, a second input connected to said output of said inverter and an output, said multiplexer outputting either said first input or said second input dependent upon a predetermined bit of said instruction specified subset of bits of said data, and a priority encoder having an input connected to said output of said multiplexer and an output forming a predetermined number of least significant bits to be stored in an instruction specified data register, said priority encoder determining a first non-zero bit of said input starting from the MSB and generating a corresponding output code.

5. An application specific instruction processor comprising:

a fetch unit for fetching instructions from a memory;

an instruction decoder connected to said fetch unit for decoding instructions fetched by said fetch unit;

a data register file including a plurality of data registers;

a load/store unit connected to said instruction decoder, said data register file and an external memory, said load/store unit operable in response to a decoded load instruction to transfer data from an instruction specified address in external memory to an instruction specified one of said plurality of data registers, and in response to a decoded store instruction to transfer data from an instruction specified one of said data register to an instruction specified address in external memory;

at least one general purpose functional unit connected to said instruction decoder and said data register file, said at least one general purpose functional unit operable in response to at least one instruction to recall data from at least one instruction specified data register, perform an instruction specified data processing operation and store results in an instruction specified one of said data registers;

at least one special purpose functional unit connected to said instruction decoder and said data register file, said at least one special purpose functional unit operable in response to at least one instruction to recall data from at least one instruction specified data register, perform an instruction specified special purpose data processing and store results in an instruction specified one of said data registers;

said fetch unit, said instruction decoder, said data register file, said load/store unit and said at least one general purpose functional unit operate in synchronism with a processor clock signal; and said at least one special purpose functional unit includes a look-up table unit receiving data in synchronism with a external clock signal and said external clock signal, said sample unit including an address unit receiving said external clock signal and external angle signals, said address unit generating a multi-bit address corresponding to said external angle signals in synchronism with said external clock signal;

a memory table having a plurality of data memories corresponding to a sine function value stored at respective addresses, said memory table receiving said external clock signal and said multi-bit address and outputting said corresponding sine function value in synchronism with said external clock signal;

a quadrant adjustment unit receiving said external clock signal, said sine function value and a quadrant signal from said address generator unit, said quadrant adjustment unit generating a sine function value adjusted for quadrant corresponding to said quadrant signal in synchronism with said external clock signal, a sign and I/Q swap control unit receiving said external clock signal, said quadrant adjusted sine function value and an external quadrant signal, said sign and I/Q swap control unit generating an sine function value having a sign and I/Q corresponding to said external quadrant signal in synchronism with said external clock signal, an amplitude control unit receiving said external clock signal, said sign and I/Q adjusted sine function value and an external amplitude signal, said amplitude control unit generating a sine function signal having an amplitude corresponding to said external amplitude signal in synchronism with said external clock signal, a data register receiving said external clock signal, said sine function signal from said amplitude control unit, an external read signal and having an external read data output, said data register storing said sine function signal from said amplitude control unit in synchronism with said external clock signal, and outputting stored data in response to said external read signal, a synchronizer receiving said sine function signal recalled from said data register and said processor clock signal and generating a recalled data in synchronism with said processor clock signal.

6. An application specific instruction processor comprising:

a fetch unit for fetching instructions from a memory;

an instruction decoder connected to said fetch unit for decoding instructions fetched by said fetch unit;

a data register file including a plurality of data registers;

a load/store unit connected to said instruction decoder, said data register file and an external memory, said load/store unit operable in response to a decoded load instruction to transfer data from an instruction specified address in external memory to an instruction specified one of said plurality of data registers, and in response to a decoded store instruction to transfer data from an instruction specified one of said data register to an instruction specified address in external memory;

at least one general purpose functional unit connected to said instruction decoder and said data register file, said at least one general purpose functional unit operable in response to at least one instruction to recall data from at least one instruction specified data register, perform an instruction specified data processing operation and store results in an instruction specified one of said data registers;

at least one special purpose functional unit connected to said instruction decoder and said data register file, said at least one special purpose functional unit operable in response to at least one instruction to recall data from at least one instruction specified data register, perform an instruction specified special purpose data processing and store results in an instruction specified one of said data registers, wherein said at least one special purpose functional unit includes an infinite impulse response filter unit including a first multiplexer having a first input receiving a most significant half of the bits of an instruction specified source register of said data register file, a second input receiving a least significant half of the bits of said instruction specified source register, and an output, said first multiplexer outputting an instruction selected one of said first input or said second input, a first infinite impulse response filter having an input receiving a most significant half of the bits of said output of said first multiplexer and an output, said first infinite impulse response filter generating an output of an instruction selected one of an low pass filter or a high pass filter of said input, a second infinite impulse response filter having an input receiving a least significant half of the bits of said output of said first multiplexer and an output, said second infinite impulse response filter generating an output of said instruction selected one of an low pass filter or a high pass filter of said input, a second multiplexer having a first input receiving a most significant half of the bits of an instruction specified destination register of said data register file, a second input receiving a least significant half of the bits of said instruction specified destination register, and an output, said second multiplexer outputting an instruction selected one of said first input or said second input, and a merge logic unit receiving said output of said first infinite impulse response filter unit, said output of said second infinite response filter unit and said output of said second multiplexer, said merge logic unit generating an instruction specified concatenation of said output of said first infinite impulse response filter unit, said output of said second infinite response filter unit and said output of said second multiplexer for storage in said instruction selected destination register.

7. The application specific instruction processor of claim 6, wherein:

said first infinite impulse response filter unit and said second infinite impulse response filter unit generate said instruction specified low pass filter according to the equation $$H_1(z) = \frac{1 - 2^{-K}z^{-1}}{1 - (1 - 2^{-K})z^{-1}}$$

where K=(3, 4, 5, 6, 7, 8, 9, 10).

8. The application specific instruction processor of claim 6, wherein:

said first infinite impulse response filter unit and said second infinite impulse response filter unit generate said instruction specified high pass filter according to the equation $$H_2(z) = \frac{(1-2^{-K-1})(1-z^{-1})}{1-(1-2^{-K})z^{-1}}$$

where K=(3, 4, 5, 6, 7, 8, 9, 10).

9. An application specific instruction processor comprising:
- a fetch unit for fetching instructions from a memory;
- an instruction decoder connected to said fetch unit for decoding instructions fetched by said fetch unit;
- a data register file including a plurality of data registers;
- a load/store unit connected to said instruction decoder, said data register file and an external memory, said load/store unit operable
  - in response to a decoded load instruction to transfer data from an instruction specified address in external memory to an instruction specified one of said plurality of data registers, and
  - in response to a decoded store instruction to transfer data from an instruction specified one of said data register to an instruction specified address in external memory;
- at least one general purpose functional unit connected to said instruction decoder and said data register file, said at least one general purpose functional unit operable in response to at least one instruction to recall data from at least one instruction specified data register, perform an instruction specified data processing operation and store results in an instruction specified one of said data registers;
- at least one special purpose functional unit connected to said instruction decoder and said data register file, said at least one special purpose functional unit operable in response to at least one instruction to recall data from at least one instruction specified data register, perform an instruction specified special purpose data processing and store results in an instruction specified one of said data registers, wherein said at least one special purpose functional unit includes an infinite impulse response filter unit including
  - a first multiplexer having a first input receiving a most significant half of the bits of an instruction specified source register of said data register file, a second input receiving a least significant half of the bits of said instruction specified source register, and an output, said first multiplexer outputting an instruction selected one of said first input or said second input,
  - an infinite impulse response filter having an input receiving said output of said first multiplexer and an output, said infinite impulse response filter generating an output of an instruction selected one of an low pass filter or a high pass filter of said input,
  - a second multiplexer having a first input receiving a most significant half of the bits of an instruction specified destination register of said data register file, a second input receiving a least significant half of the bits of said instruction specified destination register, and an output, said second multiplexer outputting an instruction selected one of said first input or said second input, and
  - a merge logic unit receiving said output of said infinite impulse response filter unit, and said output of said second multiplexer, said merge logic unit generating an instruction specified concatenation of said output of said infinite impulse response filter unit and said output of said second multiplexer for storage in said instruction selected destination register.

10. The application specific instruction processor of claim 9, wherein:
said first infinite impulse response filter unit and said second infinite impulse response filter unit generate said instruction specified low pass filter according to the equation $$H_1(z) = \frac{1-2^{-K}z^{-1}}{1-(1-2^{-K})z^{-1}}$$

where K=(3, 4, 5, 6, 7, 8, 9, 10).

11. The application specific instruction processor of claim 9, wherein:
said first infinite impulse response filter unit and said second infinite impulse response filter unit generate said instruction specified high pass filter according to the equation $$H_2(z) = \frac{(1-2^{-K-1})(1-z^{-1})}{1-(1-2^{-K})z^{-1}}$$

where K=(3, 4, 5, 6, 7, 8, 9, 10).

12. An application specific instruction processor comprising:
- a fetch unit for fetching instructions from a memory;
- an instruction decoder connected to said fetch unit for decoding instructions fetched by said fetch unit;
- a data register file including a plurality of data registers;
- a load/store unit connected to said instruction decoder, said data register file and an external memory, said load/store unit operable
  - in response to a decoded load instruction to transfer data from an instruction specified address in external memory to an instruction specified one of said plurality of data registers, and
  - in response to a decoded store instruction to transfer data from an instruction specified one of said data register to an instruction specified address in external memory;
- at least one general purpose functional unit connected to said instruction decoder and said data register file, said at least one general purpose functional unit operable in response to at least one instruction to recall data from at least one instruction specified data register, perform an instruction specified data processing operation and store results in an instruction specified one of said data registers;
- at least one special purpose functional unit connected to said instruction decoder and said data register file, said at least one special purpose functional unit operable in response to at least one instruction to recall data from at least one instruction specified data register, perform an instruction specified special purpose data processing and store results in an instruction specified one of said data registers, wherein said at least one special purpose functional unit includes an infinite impulse response filter unit including
  - a first infinite impulse response filter having an input receiving a most significant half of the bits of an instruction selected data register of said data register file, said first infinite impulse response filter generating an output of an instruction selected one of an low pass filter or a high pass filter of said input,
a second infinite impulse response filter having an input receiving a least significant half of the bits of said instruction selected data register of said data register file, said second infinite impulse response filter generating an output of said instruction selected one of an low pass filter or a high pass filter of said input, and
a merge logic unit receiving said output of said first infinite impulse response filter unit and said output of said second infinite response filter unit, said merge logic unit generating an instruction specified concatenation of said output of said first infinite impulse response filter unit and said output of said second infinite response filter unit for storage in said instruction selected destination register.

13. The application specific instruction processor of claim 12, wherein:
said first infinite impulse response filter unit and said second infinite impulse response filter unit generate said instruction specified low pass filter according to the equation $$H_1(z) = \frac{1 - 2^{-K}z^{-1}}{1 - (1 - 2^{-K})z^{-1}}$$

where K=(3, 4, 5, 6, 7, 8, 9, 10).

14. The application specific instruction processor of claim 12, wherein:
said first infinite impulse response filter unit and said second infinite impulse response filter unit generate said instruction specified high pass filter according to the equation $$H_2(z) = \frac{(1 - 2^{-K-1})(1 - z^{-1})}{1 - (1 - 2^{-K})z^{-1}}$$

where K=(3, 4, 5, 6, 7, 8, 9, 10).

* * * * *